United States Patent
Walker et al.

(10) Patent No.: US 11,456,519 B2
(45) Date of Patent: Sep. 27, 2022

(54) ORIENTATION ADJUSTABLE MOUNTS AND RELATED METHODS OF LOCKING INTO ALIGNMENT

(71) Applicant: CommScope Technologies LLC, Hickory, NC (US)

(72) Inventors: David J. Walker, Glasgow (GB); Jasmine M. M. Wright, Edinburgh (GB); James M. Jefferson, Glenrothes (GB); Donald B. Gardner, Livingston (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/258,773

(22) PCT Filed: Apr. 4, 2019

(86) PCT No.: PCT/US2019/025701
§ 371 (c)(1),
(2) Date: Jan. 8, 2021

(87) PCT Pub. No.: WO2020/013898
PCT Pub. Date: Jan. 16, 2020

(65) Prior Publication Data
US 2021/0328322 A1 Oct. 21, 2021

Related U.S. Application Data

(60) Provisional application No. 62/696,029, filed on Jul. 10, 2018.

(51) Int. Cl.
*H01Q 1/12* (2006.01)
*F16B 2/06* (2006.01)
(Continued)

(52) U.S. Cl.
CPC .......... *H01Q 1/1228* (2013.01); *F16B 2/065* (2013.01); *F16M 13/022* (2013.01); *H01Q 1/125* (2013.01); *H01Q 3/08* (2013.01)

(58) Field of Classification Search
CPC combination set(s) only.
See application file for complete search history.

(56) References Cited

U.S. PATENT DOCUMENTS 2,723,140 A  11/1955  Graham
5,906,450 A   5/1999  Ng
(Continued)

FOREIGN PATENT DOCUMENTS

CN  102517621 A   6/2012
FR  2180251 A5  11/1973
(Continued)

OTHER PUBLICATIONS

International Search Report and the Written Opinion of the International Searching Authority corresponding to International Patent Application No. PCT/US2019/025701 (15 pages) (dated Aug. 7, 2019).

(Continued)

*Primary Examiner* — Monica E Millner
(74) *Attorney, Agent, or Firm* — Myers Bigel, P.A.

(57) ABSTRACT

Mount assemblies that include clamps that can clamp directly to external threads of a respective adjuster bolt to lock the adjuster bolt in a desired orientation and/or position and provide for triangulated adjustment allowing for increased alignment precision. The mount assemblies can be particularly suitable for locking an aligned antenna into a desired azimuth position.

20 Claims, 20 Drawing Sheets

(51) Int. Cl.
*F16M 13/02* (2006.01)
*H01Q 3/08* (2006.01)

(56) References Cited

U.S. PATENT DOCUMENTS

| | | | |
|---|---|---|---|
| 6,131,859 A | 10/2000 | Giuliano | |
| 6,262,691 B1 | 7/2001 | Austin et al. | |
| 6,407,713 B1* | 6/2002 | Mallenius | F16M 11/10 |
| | | | 343/765 |
| 6,413,006 B1 | 7/2002 | Neugart | |
| 6,657,598 B2* | 12/2003 | Tulloch | H01Q 1/1257 |
| | | | 343/765 |
| 8,020,824 B2* | 9/2011 | Pan | H01Q 1/1207 |
| | | | 248/299.1 |
| 8,052,107 B2* | 11/2011 | Yang | H01Q 19/12 |
| | | | 248/201 |
| 8,794,578 B2* | 8/2014 | Lin | H01Q 1/125 |
| | | | 248/218.4 |
| 9,136,582 B2* | 9/2015 | Lewry | H01Q 3/04 |
| 9,172,137 B2* | 10/2015 | Lee | H01Q 1/125 |
| 9,966,649 B2* | 5/2018 | Christie | H01Q 1/125 |
| 10,096,885 B2 | 10/2018 | Renilson et al. | |
| 10,418,683 B2* | 9/2019 | Bensen | H01Q 1/1228 |
| 2005/0264467 A1 | 12/2005 | Lin et al. | |
| 2008/0150831 A1* | 6/2008 | Tulloch | H01Q 1/1264 |
| | | | 343/882 |
| 2011/0031360 A1 | 2/2011 | Pan | |
| 2012/0211624 A1 | 8/2012 | Lin et al. | |
| 2012/0212393 A1* | 8/2012 | Lee | F16B 35/005 |
| | | | 343/880 |
| 2013/0221182 A1 | 8/2013 | Renilson et al. | |
| 2014/0294496 A1 | 10/2014 | Gardiner | |
| 2014/0346294 A1 | 11/2014 | Lewry et al. | |
| 2015/0047445 A1 | 2/2015 | Yang et al. | |
| 2017/0288292 A1* | 10/2017 | Renilson | H01Q 3/08 |

FOREIGN PATENT DOCUMENTS

| | | |
|---|---|---|
| GB | 1369177 A | 10/1974 |
| WO | 2014189592 A1 | 11/2014 |
| WO | 2016161319 A1 | 10/2016 |
| WO | 2018048624 A1 | 3/2018 |

OTHER PUBLICATIONS

Extended European Search Report corresponding to European Patent Application No. (8 pages) (dated Feb. 25, 2022).

* cited by examiner

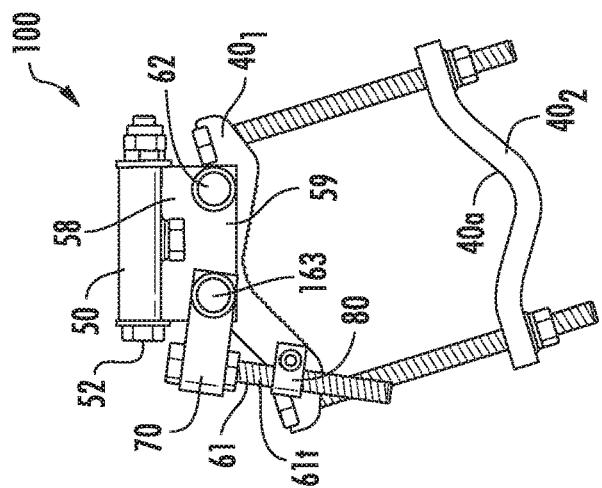
FIG. 4C  -15° AZIMUTH ADJUSTMENT
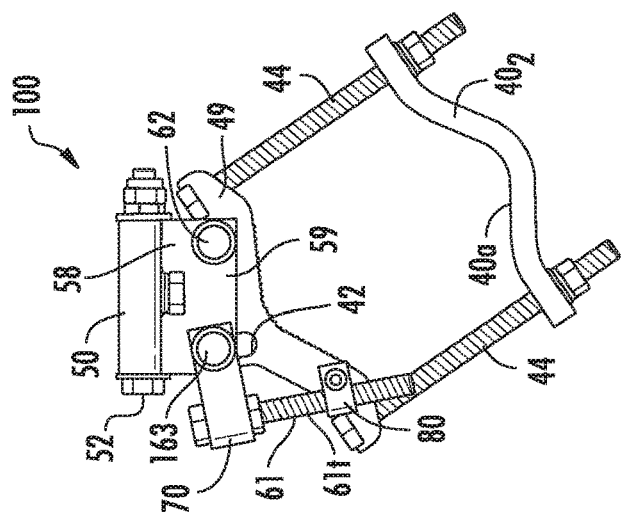
FIG. 4B  NORMINAL AZIMUTH ADJUSTMENT
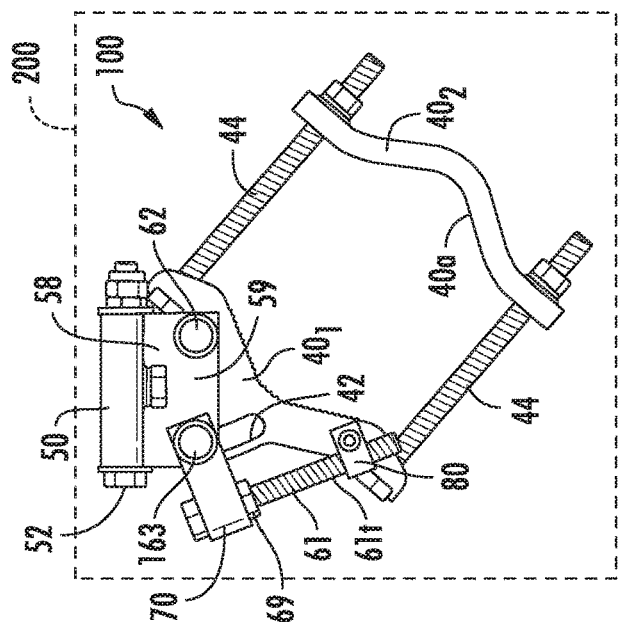
FIG. 4A  +15° AZIMUTH ADJUSTMENT

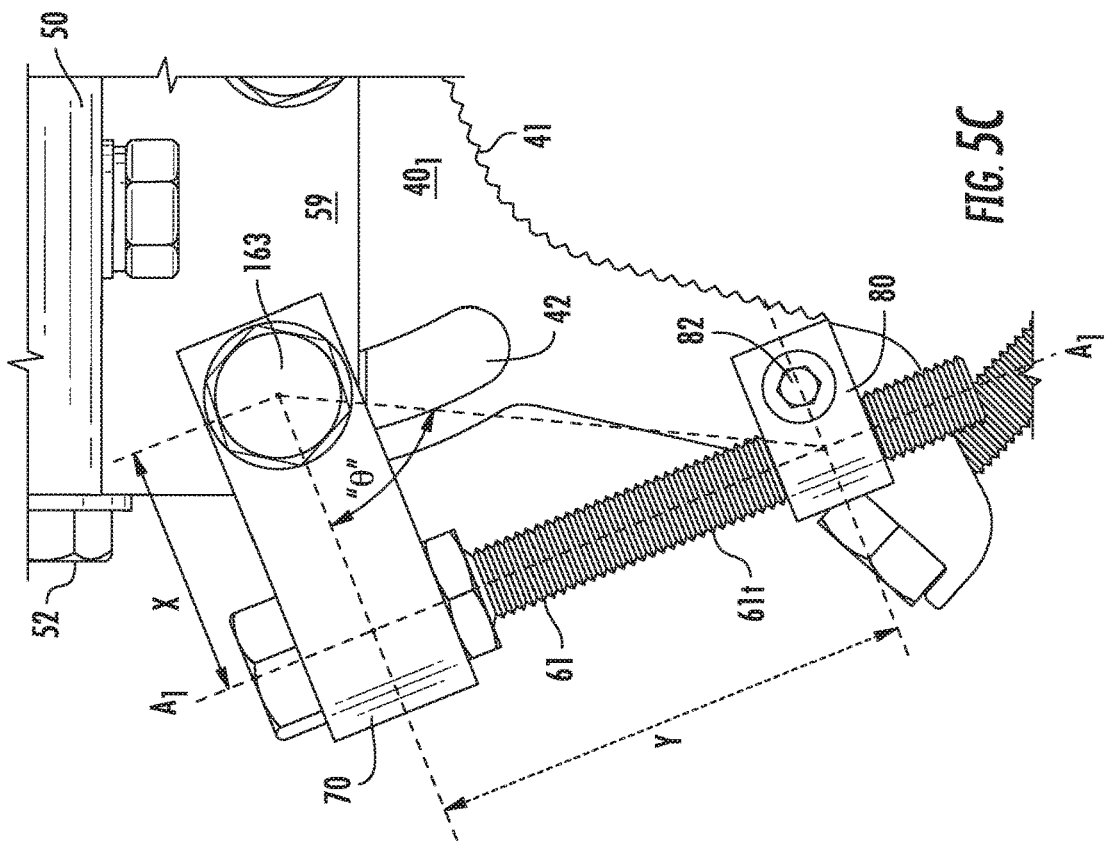
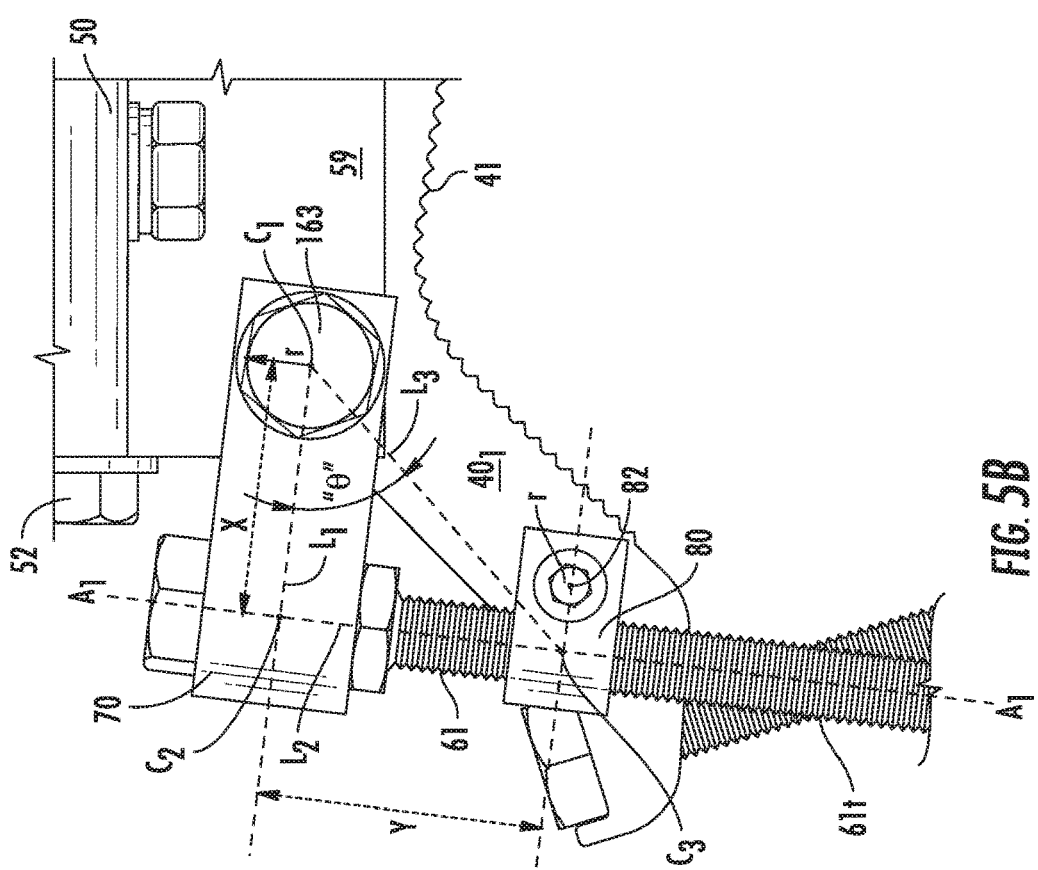

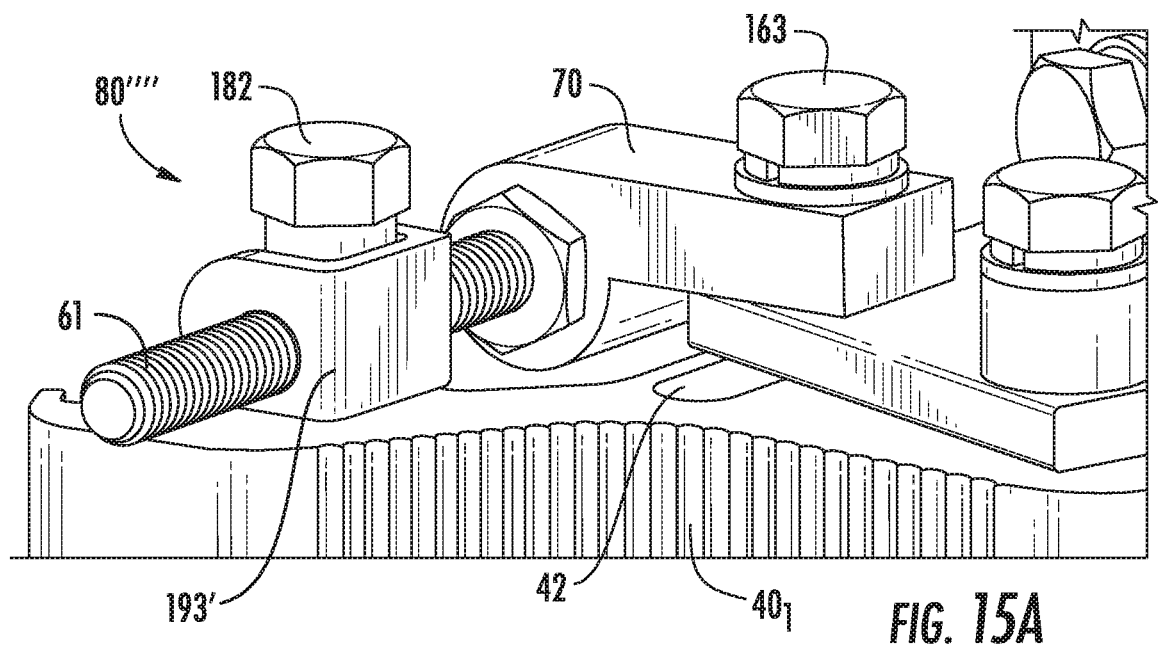
FIG. 15A
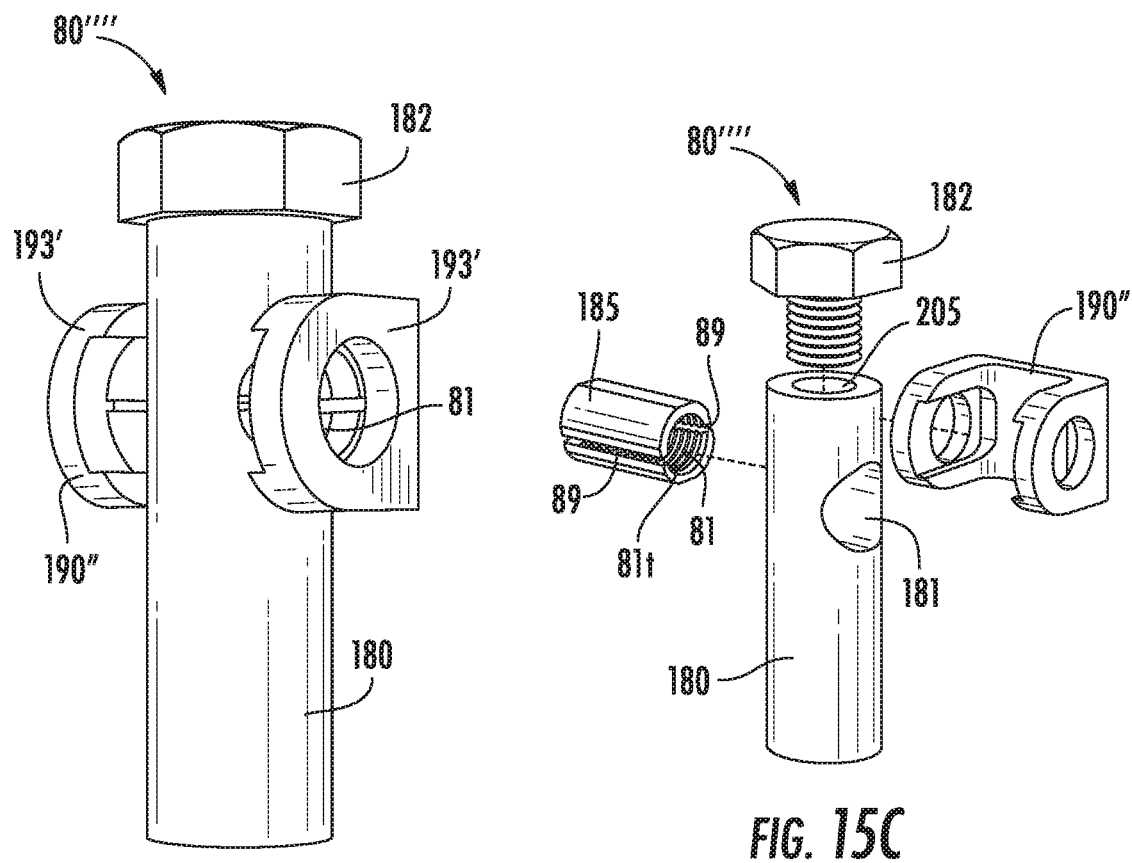
FIG. 15B
FIG. 15C

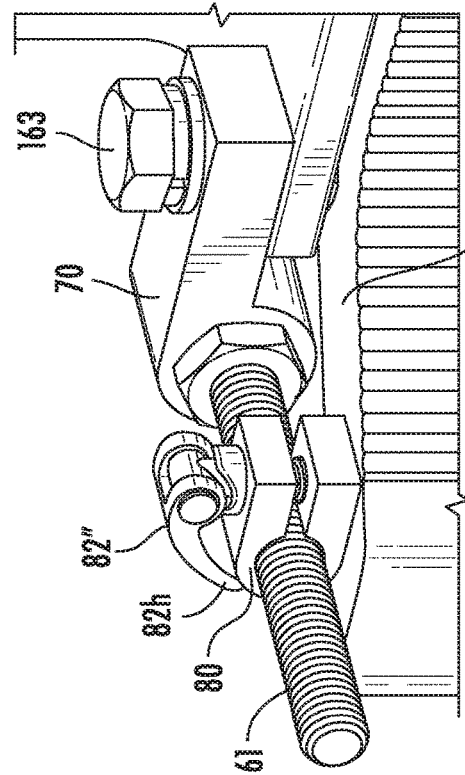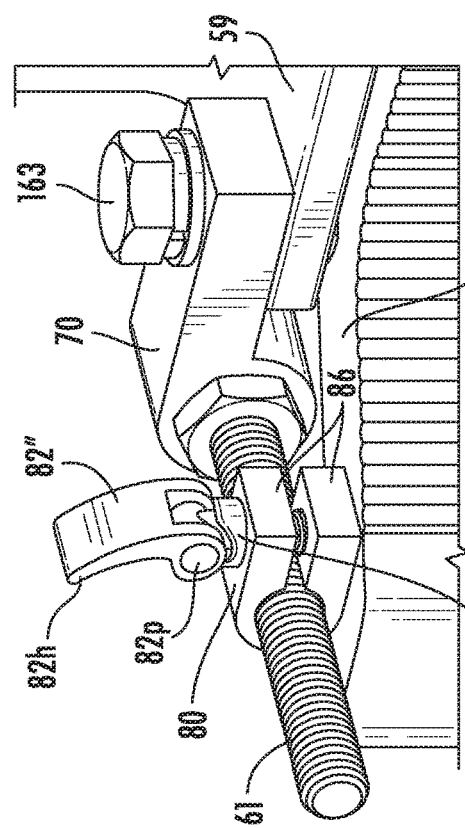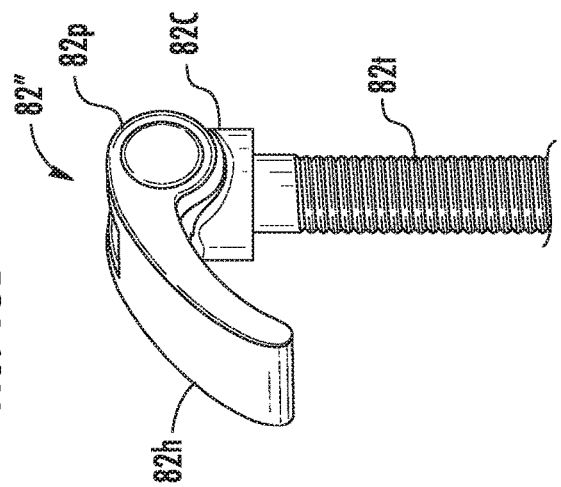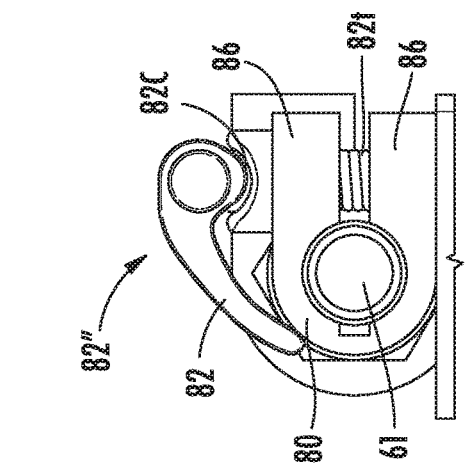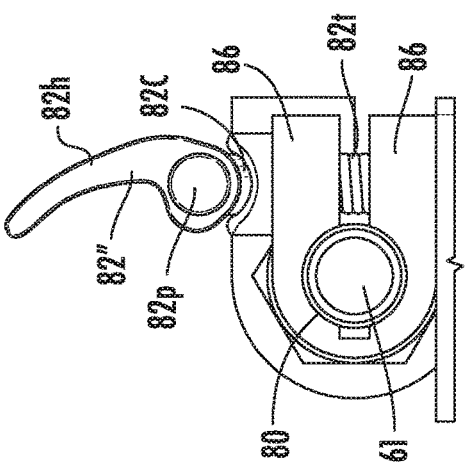

ORIENTATION ADJUSTABLE MOUNTS AND RELATED METHODS OF LOCKING INTO ALIGNMENT

RELATED APPLICATIONS

This application is a 35 USC § 371 US national stage application of PCT/US2019/025701, filed Apr. 4, 2019, which claims the benefit of and priority to U.S. Provisional Application Ser. No. 62/696,029, filed Jul. 10, 2018, the contents of each of which are hereby incorporated by reference as if recited in full herein.

FIELD OF THE INVENTION

The invention relates to mounting assemblies and is particularly suitable for outside antennas with alignment adjustment.

BACKGROUND

Point-to-point antennas typically require fine adjustment for alignment (in both elevation and azimuth) and need to be locked into the desired aligned position. There is an industry trend toward installation of higher frequency antenna links, such as smaller antennas ranging from 1 foot (0.3 m) to 2 foot (0.6 m) diameter that can operate up to about 80 GHz, for example. Regulatory performance has tight restrictions on the alignment accuracy due to reduced beam widths at higher frequencies. Thus, accuracy of alignment is important and is becoming more significant. However, the locking mechanism can affect the alignment, particularly the azimuth alignment, leading to the need for readjustment and increased installation time. Indeed, installation of 80 GHz links can be quite time consuming and installation can take multiple days.

FIG. 1 illustrates an exemplary prior art antenna 10, a pipe (also called a "pole") clamp 40 with cooperating clamping members $40_1$, $40_2$ that attach the antenna 10 to a pole 20, an elevation adjustment sub-assembly 50, and an azimuth adjustment sub-assembly 60.

FIGS. 2A-2C illustrate a prior art elevation adjustment. Screws 53, 54 and 55 are torqued to 38 Nm then loosened a quarter-turn to allow for adjustment. The elevation is adjusted by rotating the elevation adjuster bolt 52 (end nuts 57 are not tightened or loosened). Once in the desired elevation, the screws 53, 54 and 55 can be re-torqued to 38 Nm.

FIGS. 3A-3C illustrate a prior art azimuth adjustment. Screws 62, 63 can be torqued to 38 Nm, then loosened by a quarter-turn to allow for adjustment. Two screw nuts 64, 65 held on an adjuster screw 61 can be rotated to adjust the azimuth direction of the antenna mount assembly. The two screw nuts 64, 65 reside on opposing sides of an adjuster boss 66 that extends down to attach to the clamp member 401. Once in position, the screws 62, 63 can be tightened, then the nuts 64, 65 can be torqued to lock the mount assembly/antenna in position. Unfortunately, these nuts 64, 65 engage along the axis of adjustment which can undesirably change the desired alignment once they lockingly engage the adjuster screw 61.

SUMMARY

Embodiments of the invention are directed to mount assemblies that provide clamps that can clamp directly to external threads of a respective adjuster bolt to lock the adjuster bolt in a desired orientation and/or position.

Embodiments of the invention are directed to mount assemblies that include a pole clamp having cooperating first and second pole clamp members, an adjuster bolt having external threads coupled to the first pole clamp member and an adjuster bolt clamp directly attachable to the external threads of the adjuster bolt to lock the adjuster bolt in a desired position.

The first pole clamp member can include a slot. The mount assembly can further include a pivot bolt coupled to a pivot body. The pivot bolt can extend through the slot in a direction that is perpendicular to the adjuster bolt. The pivot bolt can be coupled to a first end portion of the pivot body. A laterally spaced apart second end portion of the pivot body can be coupled to the adjuster bolt.

The second end portion of the pivot body can have a cylindrical channel that encloses a segment of the adjuster bolt.

The adjuster bolt can have a bolt head on one side of the pivot body and a retention member on an opposing longitudinally spaced apart side of the pivot body to hold the adjuster bolt against the pivot body.

The first pole clamp member can have a slot and the mount assembly can also include a pivot bolt that extends down through the slot in a direction that is perpendicular to the adjuster bolt. The pivot bolt can hold a first end portion of a pivot body that defines the adjuster bolt clamp.

The mount assembly can include an adjuster boss spaced apart from the pivot bolt and coupled to the first pole clamp member. The adjuster boss can also be coupled to the adjuster bolt at a location that is spaced apart from the pivot body.

The adjuster bolt clamp can be coupled to the first pole clamp member and can have a cylindrical threaded open through channel that contacts the threads of the adjuster bolt.

The adjuster bolt clamp can have first and second vertically stacked side arms that extend laterally away from a cylindrical channel with an open gap space therebetween. The cylindrical channel can have threads that directly contact the threads of the adjuster bolt to directly attach thereto. The adjuster bolt clamp can have a clamp member that extends down through the first side arm, across the open gap space, through the second side arm and into the first pole clamp member.

The clamp member can be sized and configured to change a profile of the cylindrical channel when torqued to a defined threshold value.

Optionally, the defined threshold value can be in a range of about 2 Nm to about 38 Nm.

The cylindrical channel can have a longitudinally extending recess at a location diametrically opposed to the open gap space.

The adjuster bolt clamp can have semi-circular upwardly extending and laterally spaced apart upper end portions that reside above a threaded open channel. The threaded open channel can be parallel to the adjuster bolt and can be directly attachable to the adjuster bolt.

The adjuster bolt clamp can have a cylindrical body that is perpendicular to the adjuster bolt. The adjuster bolt clamp can be coupled to the first pole clamp member. The cylindrical body can have an open channel with threads that attaches to the threads of the adjuster bolt.

The cylindrical body can have an open channel that holds an insert with an inner wall with threads that provides the threads of the open channel that attaches to the threads of the adjuster bolt.

The clamp can have an outer jacket that resides above the first pole clamp member and can cooperatively engage the cylindrical body and the insert.

The mount assembly can also include a radially extending clamp member that resides across an upper end portion of the semi-circular members above the open channel with threads. The radially extending clamp member can be sized and configured to pull the pair of semi-circular members closer together to exert a clamping force along the open channel with the threads.

The adjuster bolt can be an azimuth adjuster bolt. The mount assembly can further include a bracket holding an elevation adjuster bolt above a projecting lower portion of the bracket. The projecting lower portion can hold a pivot bolt that extends down into a slot of the first pole clamp member. The pivot bolt can be coupled to a pivot body that holds the azimuth adjuster bolt at a location spaced apart from the adjuster bolt clamp.

The adjuster bolt can have a longitudinally extending centerline defining an axis. A distance between a first point on the axis that is in line with a center point of a radius of the pivot bolt can be constant and can define a fixed x-direction distance. A distance between the first point a second point on the axis that is in line with a center point of a radius of the clamp member or a boss that holds the adjuster bolt can define an adjustable length in a y-direction. An angle $\theta$ can be defined between a first line extended from the center point of the radius of the pivot bolt to the first point and a second line extended from the center point of the radius of the pivot bolt to the second point is adjustable in a range of upper and lower angular degrees.

Optionally, the fixed x-direction distance can be in a range of about 5 mm-200 mm, such as, for example, 5 mm-30 mm.

Optionally, the adjustable length in the y-direction can be in a range of about 10-1000 mm, such as, a range of about 38 mm and about 70 mm.

The adjuster bolt clamp can have a quick release handle that is coupled to the clamp member.

The $\theta$ lower and upper angles can be about 20 degrees and about 120 degrees, respectively, such as, for example, between about 30 degrees and about 75 degrees, or between about 30 degrees and about 65 degrees.

In some particular embodiments, the $\theta$ lower and upper angles can be about 48 degrees and about 63 degrees, respectively.

The clamp member can include a self-tapping screw.

The adjuster bolt, pivot body and clamp can cooperate with the first pole clamp member to provide a +/−15 degree azimuth adjustment. The mount assembly can be an antenna mount assembly that is sized and configured to hold an antenna having a diameter in a range of 0.3 m-0.6 m.

The antenna can have an operating frequency up to about 80 GHz, optionally in a range of about 7 GHz and about 80 GHz.

Other embodiments of the invention are directed to methods of aligning an antenna attached or attachable to a pole. The methods include: attaching a pole clamp of a mount assembly to the pole, the pole clamp having cooperating first and second pole clamp members; extending or retracting an azimuth adjuster bolt with threads relative to the first pole clamp member for azimuth adjustment; and applying a clamping force directly onto the threads of the adjuster bolt using a clamp to lock the mount assembly in a desired azimuth alignment position.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE FIGURES

FIGS. 4A-4C are top views of an antenna mount sub-assembly that is adjustable over various orientations according to embodiments of the present invention.

FIGS. 5A-5C are partial, enlarged top views of the antenna mount sub-assembly shown in FIGS. 4A-4C illustrating a linear adjustment mechanism with adjustable "Y" and "θ" angular positions according to embodiments of the present invention.

FIG. 15A is a partial side perspective view of another embodiment of an antenna mount according to embodiments of the present invention.

FIG. 15B is an enlarged side perspective assembled view of the clamp shown in FIG. 15A according to embodiments of the present invention.

FIG. 15C is an exploded view of the clamp shown in FIG. 15B.

FIG. 16A is a partial side perspective view of another embodiment of an antenna mount with the clamp bolt unlocked according to embodiments of the present invention.

FIG. 16B is a partial side perspective view of another embodiment of an antenna mount with the clamp bolt locked according to embodiments of the present invention.

FIG. 16C and FIG. 16D are end views of the components shown in FIGS. 16A and 16B.

FIG. 16E is an enlarged side perspective view of the quick release clamp bolt shown in FIG. 16A.

DETAILED DESCRIPTION

Figure 1:
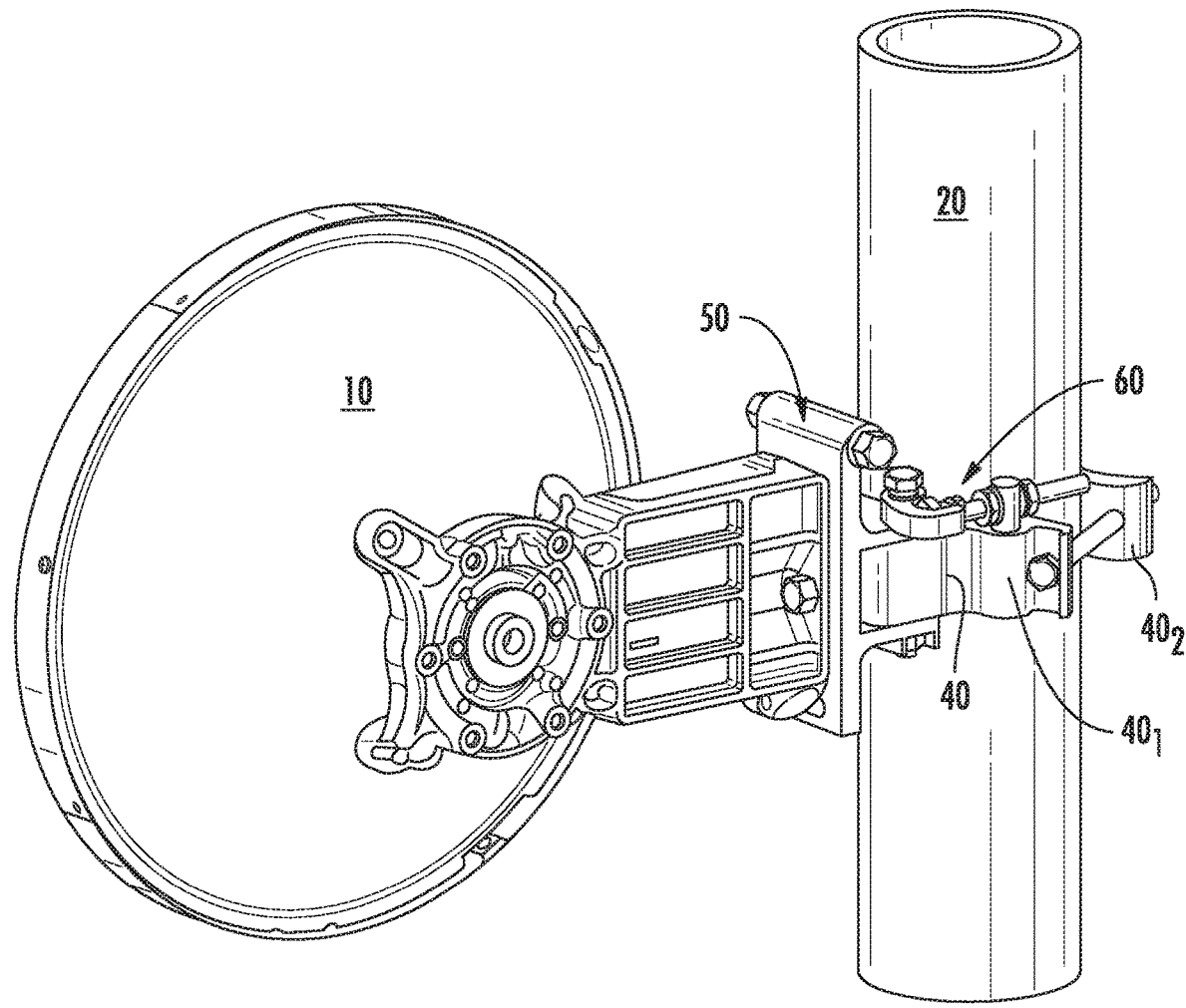
FIG. 1 is a side perspective view of a prior art antenna and mount assembly attached to a pole.
Figure 2C:
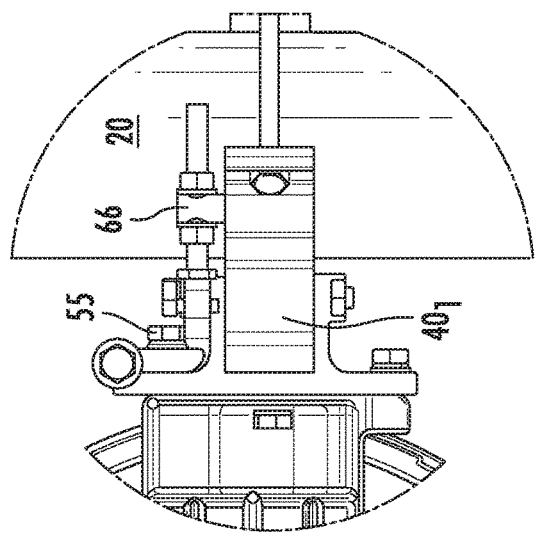
FIGS. 2A-2C are partial views of the antenna mount assembly shown in FIG. 1 illustrating a prior art elevation adjustment sequence.
Figure 2B:
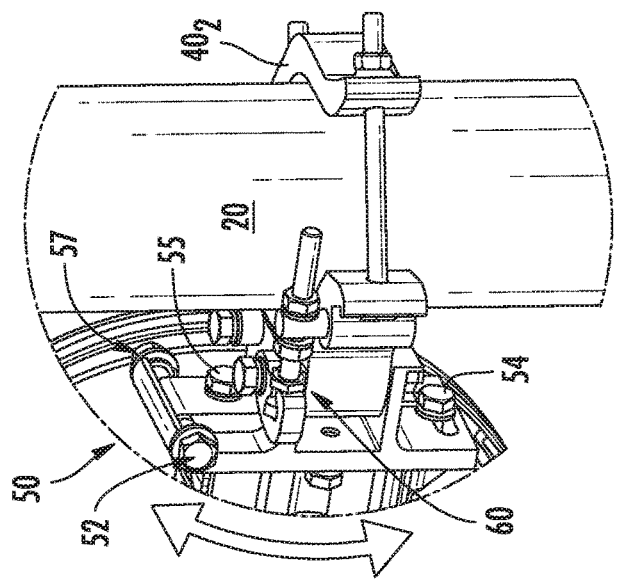
Figure 2A:
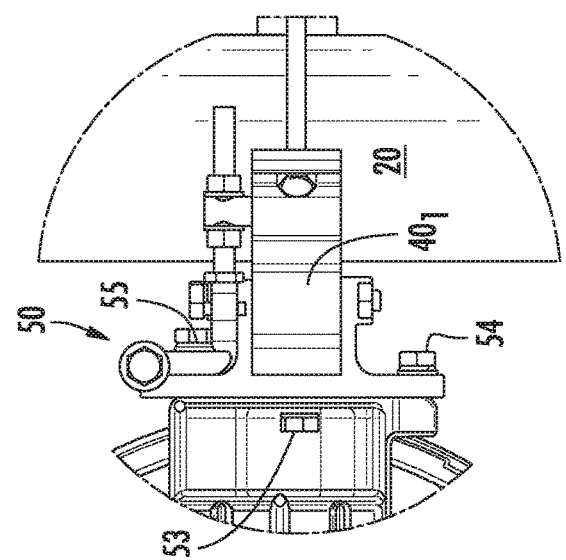
Figure 3C:
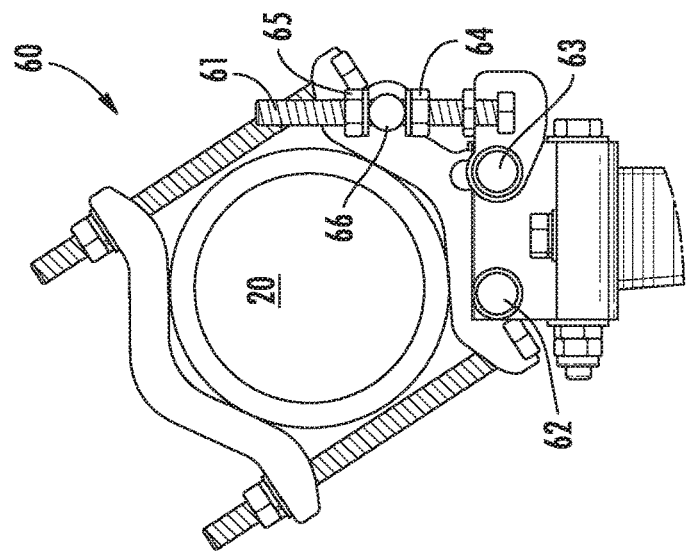
FIGS. 3A-3C are partial views of the antenna mount assembly shown in FIG. 1 illustrating a prior art azimuth adjustment sequence.
Figure 3B:
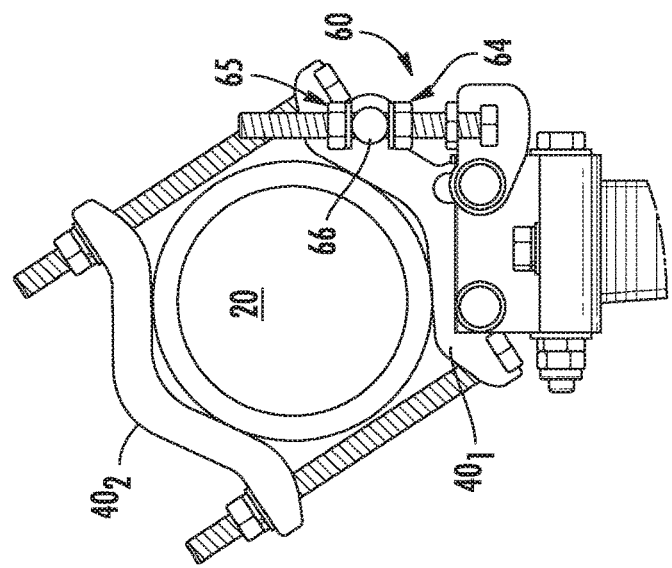
Figure 3A:
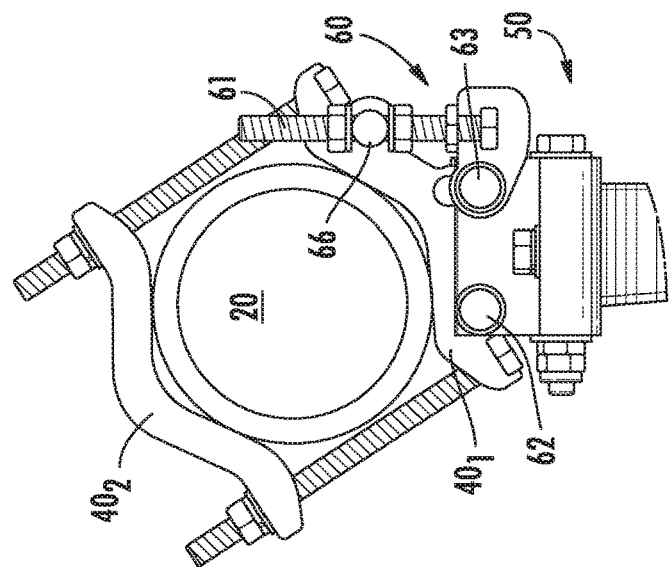

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

The terms "Fig." and "FIG." may be used interchangeably with the word "Figure" as abbreviations thereof in the specification and drawings.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−10% of the noted value.

It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items.

Referring now to FIGS. 4A-4C, a mount assembly 100 is shown. The mount assembly 100 can mount a device such as an antenna 10 (FIG. 1) to a pole 20 (FIG. 1) according to embodiments of the invention. The antenna 10 can be of conventional construction (for example, it may be a parabolic or flat panel antenna). In some particular embodiments, the antenna may be a small antenna with high operating frequency such as a frequency in a range of about 7 GHz to about 80 GHz with a diameter in a range of about 1-2 feet (0.3 m to 0.6 m). However, other the mount assembly 100 can be configured to hold other sized antennas (large or smaller) and/or antennas with other operating ranges, including above 80 GHz (i.e., an operating range in the 70/80 GHz e-band spectrum or even greater, typically up to about 100 GHz). To be clear, while particularly suitable for mounting antenna, the mount assembly 100 may also be sized and configured to hold other devices, not limited to antennas.

The mount assembly 100 can be configured to mount to a pole 20 with a diameter in a range of about 50-120 mm, in some particular embodiments.

The pole 20 may be any structure upon which a device, such as an antenna is typically mounted, such as a leg of an antenna tower, a pipe, a monopole, or the like.

Still referring to FIGS. 4A-4C, the illustrated mount assembly 100 includes a pole clamp 40 with cooperating first and second pole clamping members $40_1$, $40_2$ that engage elongate threaded members 44 and attach to an external wall of the pole 20, an elevation adjustment sub-assembly 50, and an azimuth adjustment sub-assembly 60. The first and second pole clamping members $40_1$, $40_2$ can also interchangeably be referred to as "pole clamp members". These members $40_1$, $40_2$ can have an arcuate inner facing segment 40a to couple to a pole.

The mount components can be provided as hardware in a kit 200 (FIG. 4A) with one or more separate bags, boxes or other packaging for installation.

The mount assembly 100 can provide a +/−15 degree fine elevation range and a +/−180 degree azimuth adjustment range with a +/−15 degree fine azimuth adjustment range. The term "fine" with respect to the "fine adjustment" means a final alignment position used for antenna installation that the antenna can be locked into. For example, an installer can first manually install the mount assembly 100 to the pole with a near 360 degree alignment orientation/position option relative to the pole 20, and then clamp the mount assembly 100 to the pole using the pole clamping members $40_1$, $40_2$. After this, the installer can use the fine adjustment mechanism offered by the mount assembly 100 to fine tune the alignment to the desired final alignment position. As will be discussed below (see, e.g., FIGS. 4A-4C), the mount assembly 100 can include an adjuster bolt 61 and cooperating adjuster bolt clamp 80 that can be used in the fine adjustment to eliminate "play" or backlash. Since the threads 61t of the adjuster bolt 60 are positively engaged throughout the adjustment in either direction, the risk of creating a misalignment during the final tightening is eliminated due to the fact that this is independent of the adjustment.

The adjuster bolt clamp 80 can apply a (circumferentially extending) direct clamping force to lock the mount assembly 100 into the desired final alignment position.

As shown, the elevation adjustment sub-assembly 50 includes a bracket 58 with an elevation adjustment bolt 52. The bracket 58 can be coupled to the antenna 10 during installation. The bolt 52 can rotate or pivot relative to the pole 20 to allow for elevation angle adjustment. The bracket 58 can include a projection 59 that extends toward the pole clamp 40 and the projection 59 can reside below and project outward a distance of about 0.5 inches to 3 inches from the elevation adjustment bolt 52.

Figure 5A:
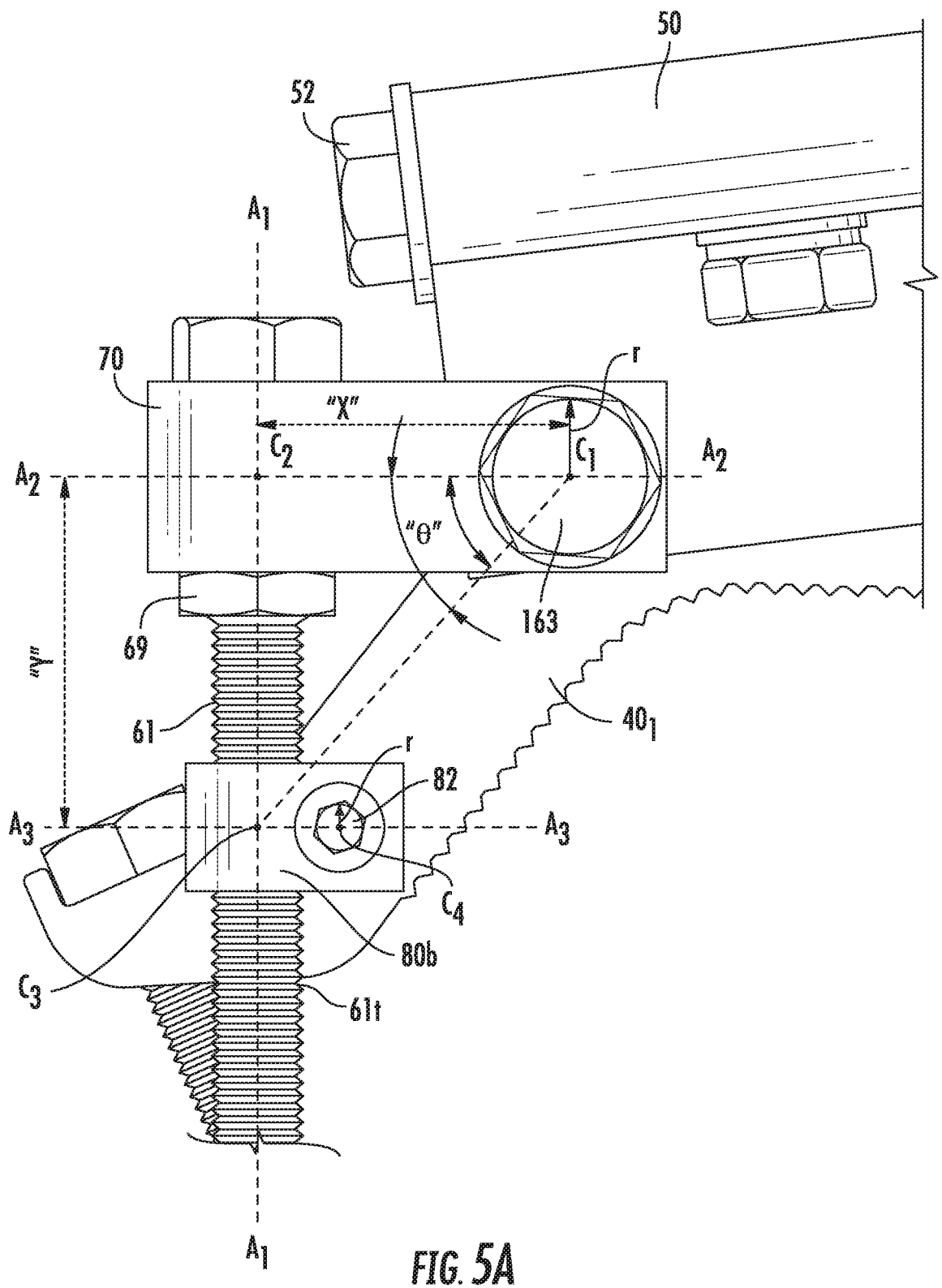

As shown in FIGS. 5A-5C, the first pole clamping member $40_1$ can include grip teeth 41 for gripping an outer wall of the pole. The first pole clamping member $40_1$ can include a slot which can be an azimuth adjustment slot 42.

The bracket 58 of the elevation adjustment sub-assembly 50 can hold a vertically extending pivot bolt 163 that can extend through the slot 42 and as well as a spaced apart parallel bolt 62. As shown, the pivot bolt 163 is attached to a pivot body 70. The pivot body 70 is also attached to azimuth adjuster bolt 61 at an opposing end portion of the pivot body 70 from where the pivot bolt 163 is attached. The pivot bolt 163 can be orthogonal to the azimuth adjuster bolt 61.

The azimuth adjustment sub-assembly 60 typically includes the pivot body 70, the pivot bolt 163, a retention member 69, such as a nut, that can provide a fixed position of the pivot body on the adjuster bolt 61, and a clamp 80 that is attached to an end portion of the first pole clamp member $40_1$. The clamp 80 can directly engage threads 61t of the adjuster bolt 61.

FIG. 4A illustrates a +15 degree azimuth adjustment orientation/configuration. FIG. 4B illustrates a nominal azimuth adjustment orientation/configuration. FIG. 4C illustrates a −15 degree azimuth adjustment orientation/configuration. Note the change in orientation of the pivot body 70 relative to the bracket 58 and the clamp 80 relative to the adjuster bolt 61 in the example configurations.

Referring now to FIGS. 5A-5C, the cooperating components can create a linear adjustment mechanism that clamps directly onto screw threads 61t as an angular adjustment/clamping force for locking an antenna alignment into position. The pivot bolt 163 can add strength to the mount assembly 100.

As shown, an axially extending centerline (along a first axis $A_1$-$A_1$) of the adjuster bolt 61 is held at a fixed "X" distance from a center $C_1$ of the pivot bolt 163. This fixed "X" distance corresponds to a line $A_2$-$A_2$ that is perpendicular to $A_1$-$A_1$ and that extends through the pivot body 70 from the center $C_1$ on one end to a point $C_2$ that intersects the axis $A_1$-$A_1$. In some particular embodiments, the X distance can be in a range of about 5 mm and about 200 mm, a range of about 5 mm and 100 mm, or a range of about 30 mm and about 40 mm.

The clamp 80 can be positioned to define a Y distance between the pivot body 70 and the clamp that is linearly adjustable. The Y distance is a straight linear distance aligned with the axially extending centerline $A_1$-$A_1$ of the adjuster bolt 61. In some embodiments, the Y distance defines a third point $C_3$ that is associated with a mid-axis point 80m of the clamp body 80b and/or that is in-line with a line $A_3$-$A_3$ that is perpendicular to and extends through an axially offset center point $C_4$ of a clamp bolt 82. As will be discussed below, the clamp bolt 82 can be used to apply clamp forces 80F (FIG. 10) using the clamp 80 according to some embodiments of the present invention. Optionally, the adjustable length in the y-direction can be in a range of about 10 mm and about 1000 mm or a range of about 38 mm and about 70 mm, in some embodiments.

The pivot bolt 163 can cooperate with the pivot body 70 to rotate the adjuster bolt 61 relative to the bracket 58 through various adjustable angles ("θ"). The angle θ changes based on the length "Y" position of the clamp 80 as the X distance is typically fixed/constant. The angle θ can be dependent on X, nominal Y and an adjustment range. In some particular embodiments, the angle θ can typically vary in a range of about 20-120 degrees, or a range of 30-75 degrees, between full opposing +/−azimuth adjustment positions, shown as between about 45 degrees and about 63 degrees.

Referring to FIG. 5A, the points $C_1$, $C_2$, $C_3$ can define a respective virtual vertex of a triangle adjustment configuration, with legs $L_1$, $L_2$, $L_3$ of the triangle with $L_1$=X, $L_2$=Y and with $L_3$ corresponding to a (virtual) line drawn through center points $C_2$, $C_3$.

Referring to FIG. 5A, in some embodiments, the adjuster bolt 61 can have a longitudinally extending centerline defining an axis $A_1$-$A_1$. A distance between a first point on the axis $C_2$ that is in line with a center point $C_1$ of a radius of the pivot bolt 163 is constant and defines the fixed X-direction distance. A distance between the first point $C_2$ to a second point $C_3$ on the axis $A_1$-$A_1$ that is in line with a center point $C_4$ of a radius of the clamp member 82 can define an adjustable length in a Y-direction. The angle "θ" can be defined between a first line extended from the center point $C_1$ of the radius of the pivot bolt 163 to the first point $C_2$ and a second line extended from the center point $C_1$ of the radius of the pivot bolt 163 to the second point $C_3$ can be adjustable in a range between upper and lower angle positions.

Figure 6A:
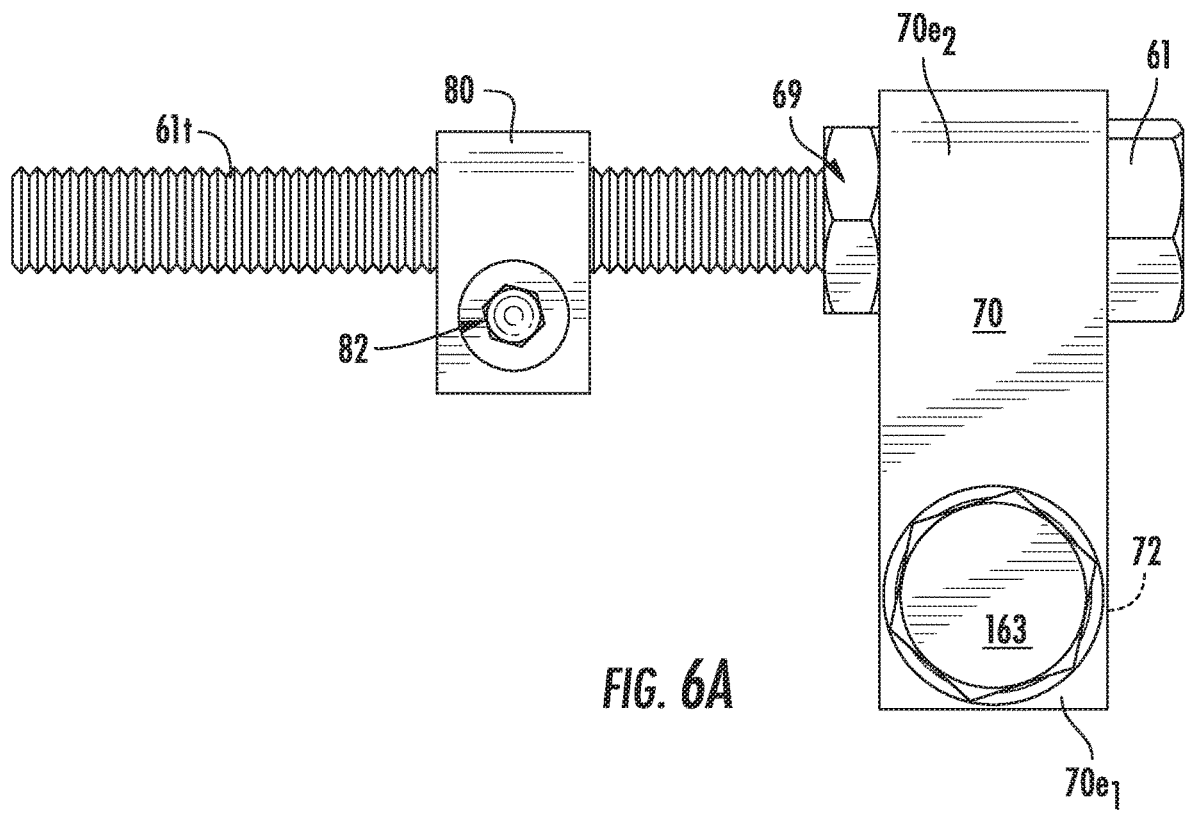
FIG. 6A is an enlarged top view of the antenna mount sub-assembly shown in FIGS. 4A and 5A.
Figure 6B:
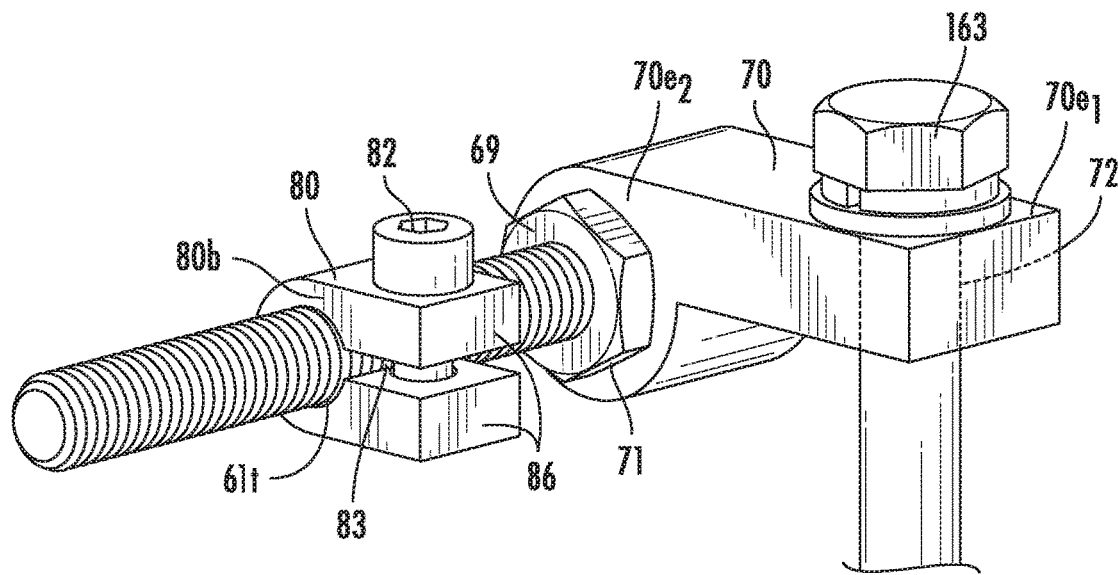
FIG. 6B is a side perspective view of the antenna mount sub-assembly shown in FIG. 6A.

Turning now to FIGS. 6A and 6B, the pivot body 70 can have opposing first and second end portions $70e_1$, $70e_2$ that are spaced apart in a direction that is perpendicular to the adjuster bolt 61. The first end portion $70e_1$ can include a through aperture 72 that receives the pivot bolt 163. The second end portion $70e_2$ can be cylindrical with a through cylindrical interior channel 71 that receives the adjuster bolt 61.

Figure 7:
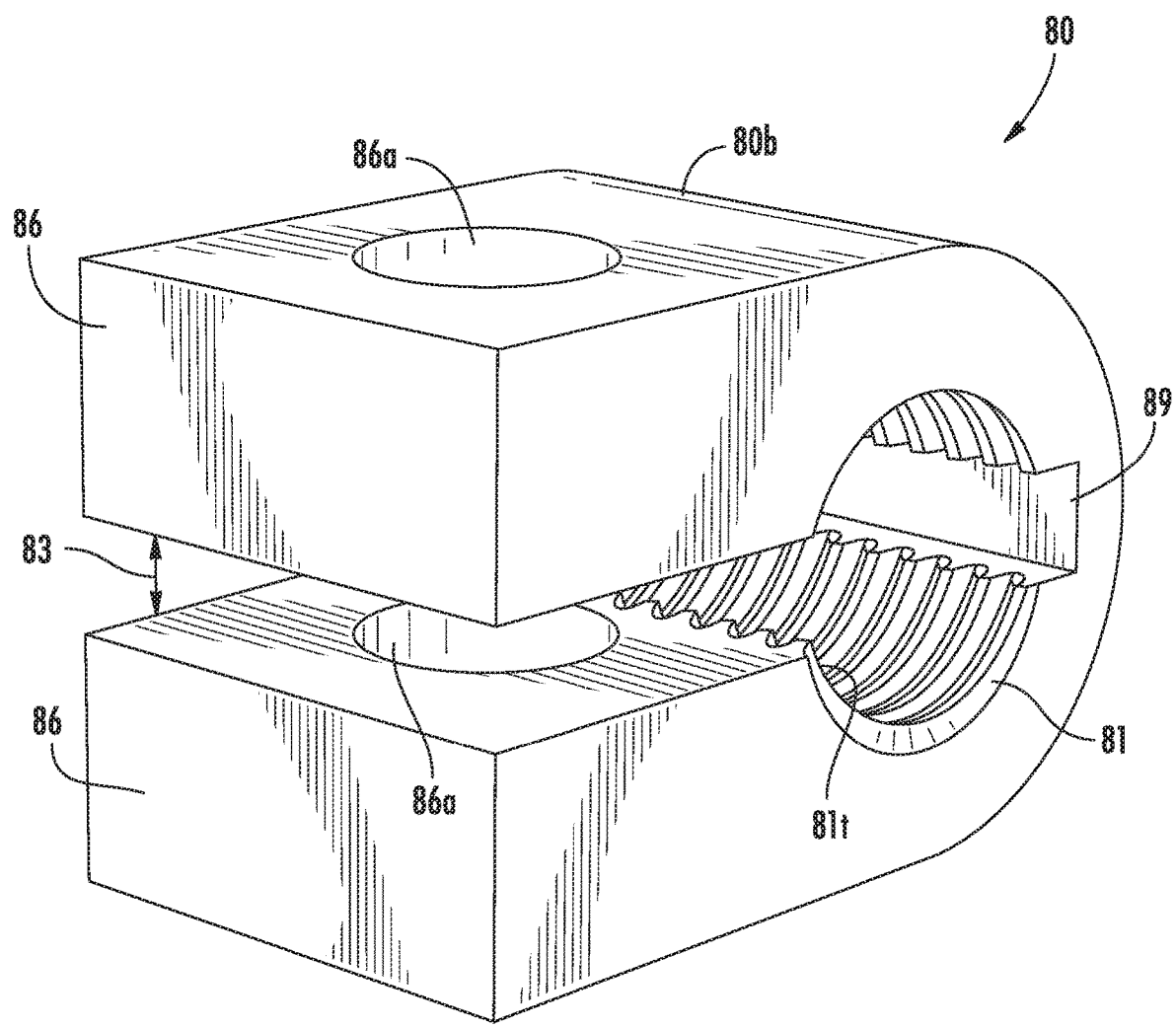
FIG. 7 is an enlarged side perspective view of an exemplary clamp of the sub-assembly shown in FIG. 6A according to embodiments of the present invention.

Referring to FIGS. 6B and 7, the clamp 80 can have a primary clamp body 80b that has a cylindrical open channel 81 for receiving the adjuster bolt 61. The clamp 80 can also have a pair of laterally extending, stacked and spaced apart cooperating arms 86 with an aligned aperture 86a and an open gap 85 therebetween. The apertures 86a receive a clamp bolt 82.

As shown in FIG. 7, the internal channel 81 can comprise threads 81t and may include a longitudinally extending recess 89 that projects outward from the channel 81 at a medial location. The recess 89 can be across from and aligned with the gap 83.

Figure 8A:
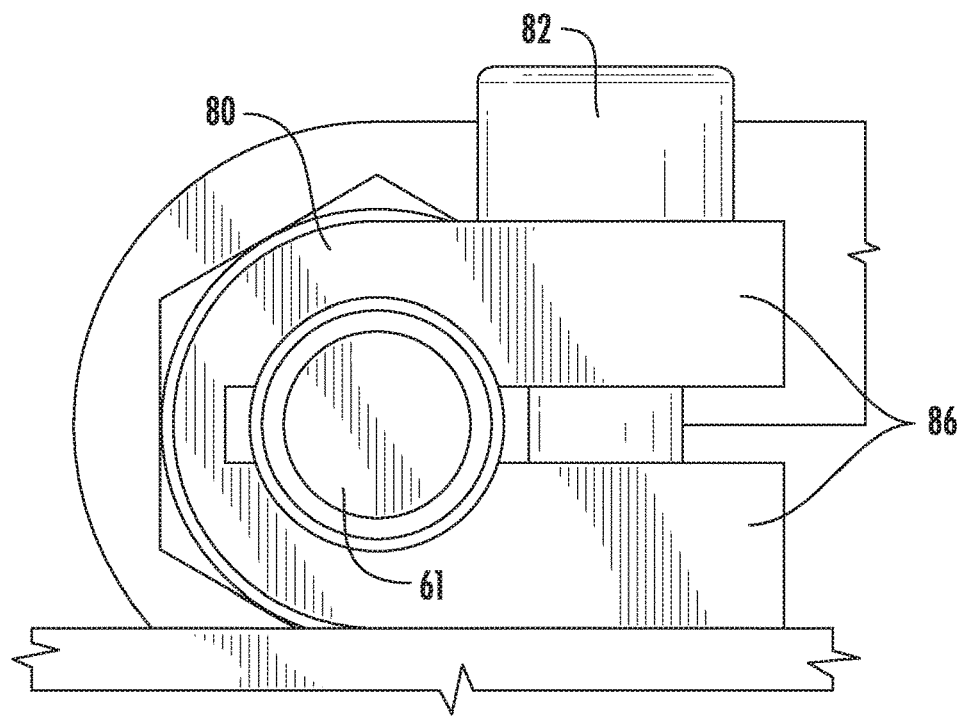
FIG. 8A is an enlarged end view of the antenna mount sub-assembly shown in FIG. 6A illustrating an unclamped configuration according to embodiments of the present invention.
Figure 8B:
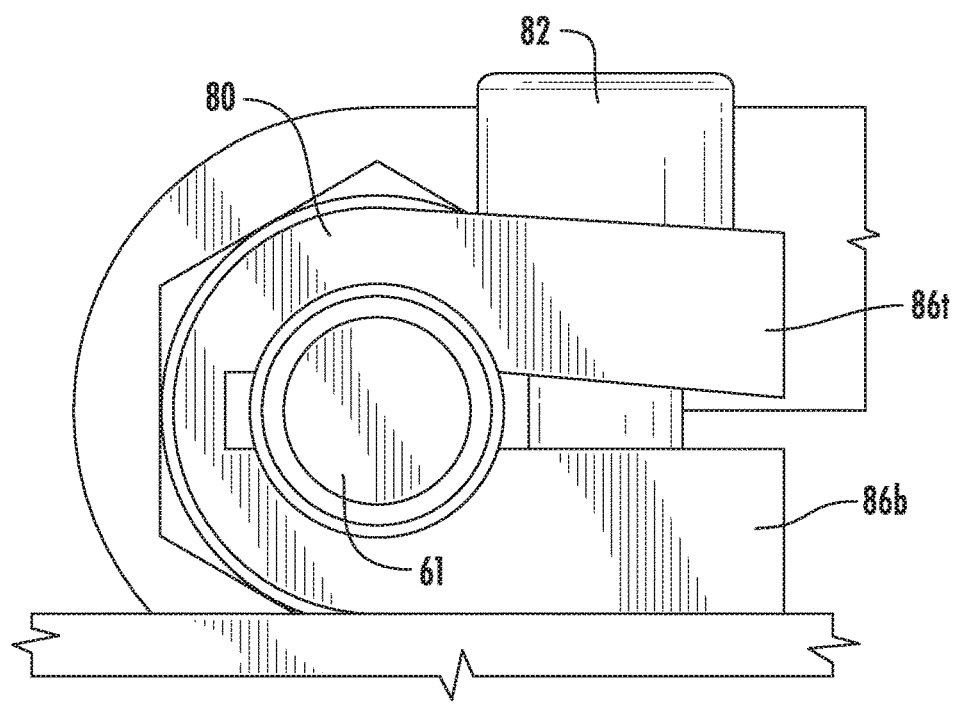
FIG. 8B is an enlarged end view of the antenna mount sub-assembly shown in FIG. 6A illustrating a clamped configuration according to embodiments of the present invention.
Figure 9A:
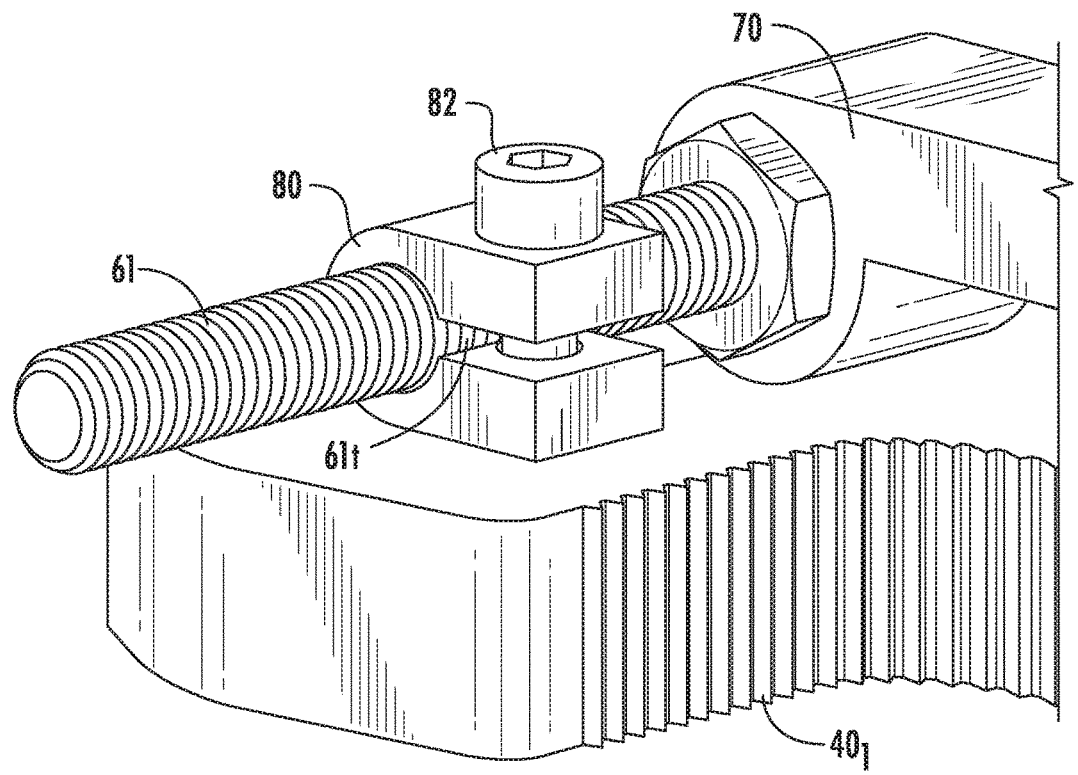
FIG. 9A is a partial side perspective end view of the antenna mount sub-assembly shown in FIG. 6A illustrating an unclamped configuration according to embodiments of the present invention.
Figure 9B:
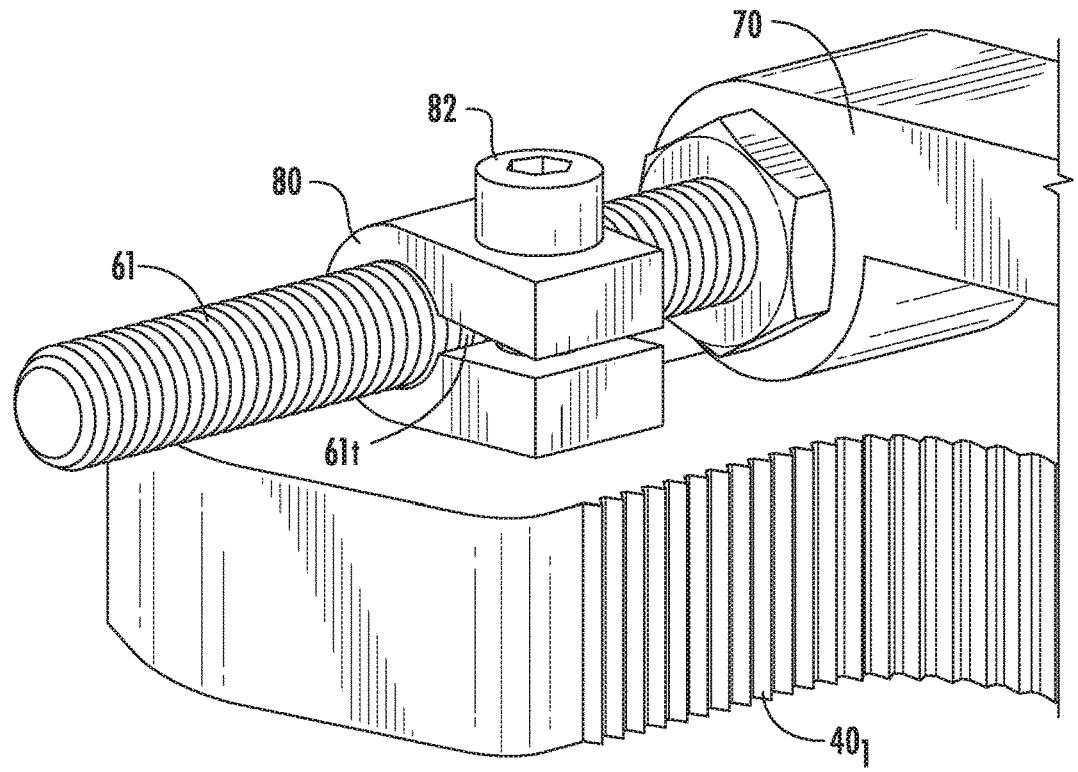
FIG. 9B is a partial side perspective end view of the antenna mount sub-assembly shown in FIG. 6A illustrating a clamped configuration according to embodiments of the present invention.

FIGS. 8A and 9A illustrate the clamp 80 holding the adjuster bolt 61 and the clamp bolt 82, with the clamp bolt 82 perpendicular to the adjuster bolt and in an unclamped configuration. FIGS. 8B and 9B illustrate those components with the clamping force applied to lock the alignment adjustment into position. As shown in FIG. 8B, the clamping force can deflect the top arm 86t toward the bottom arm 86b.

Figure 10:
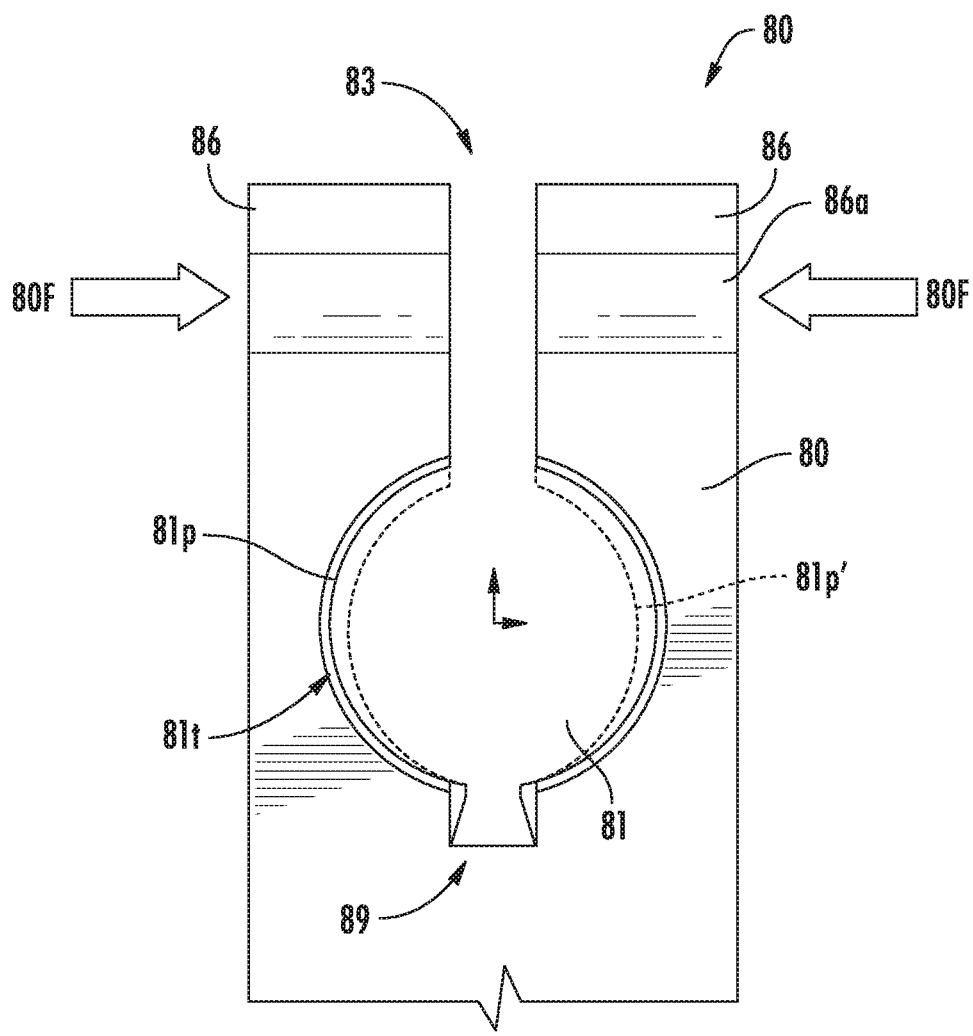
FIG. 10 is a schematic illustration of the clamp shown in FIG. 7 according to embodiments of the present invention.

Referring to FIG. 10, a schematic illustration of an exemplary clamp 80 is shown. The clamping force 80F is applied to the arms 86, laterally spaced apart from the axis of the adjuster bolt 61, which can reduce or distort an internal profile 81p of the clamp channel 81 from an unclamped configuration shown in solid line to the distorted profile 81p' shown in broken line (and the gap 83 can also be reduced). As the internal channel 81 with the threads 81t closes or reduces in size, it locks against the bolt with an increase in friction, which locks the components in position.

Figure 11A:
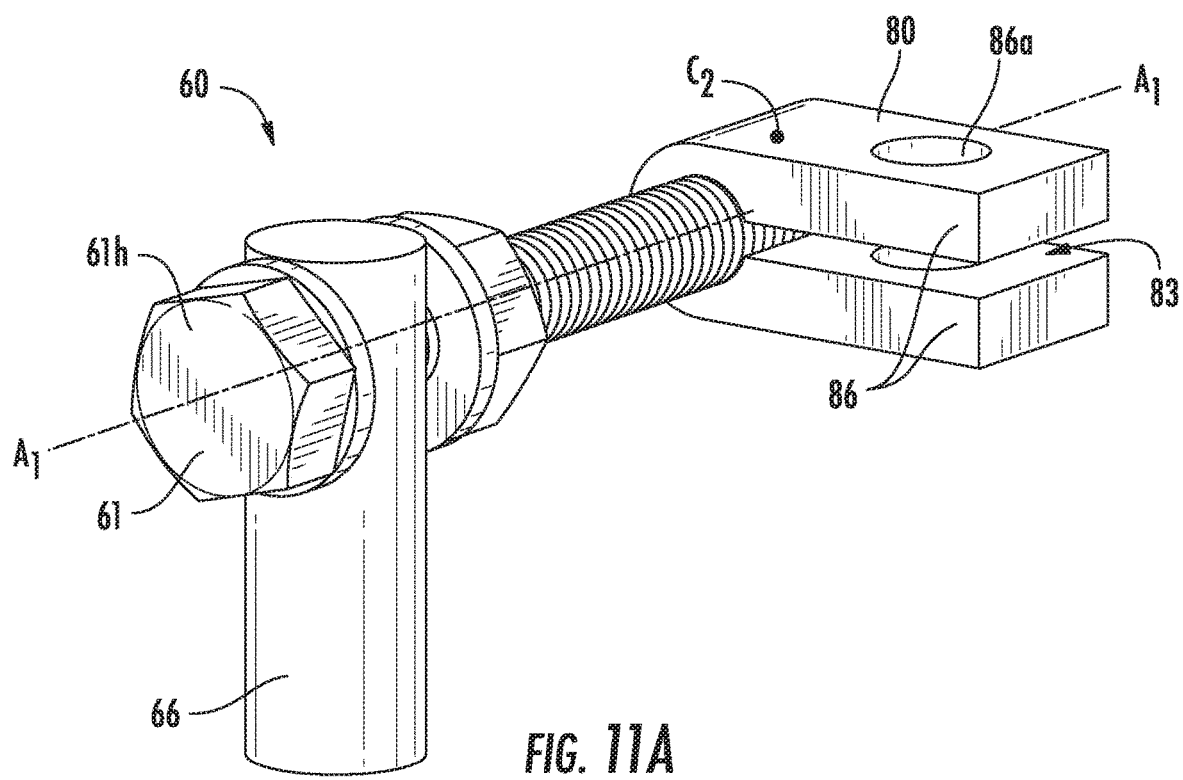
FIG. 11A is a partial side view of components of an antenna mount adjustment sub-assembly according to embodiments of the present invention.
Figure 11B:
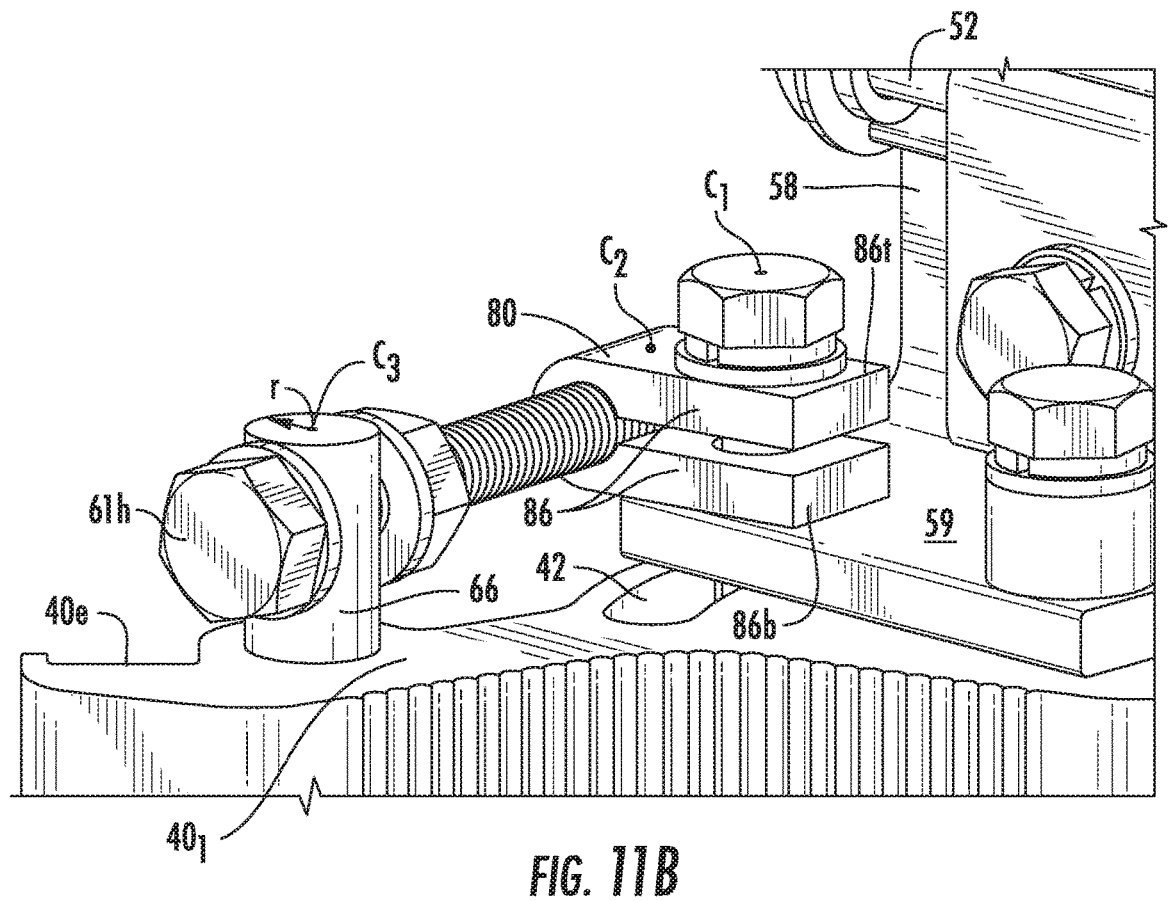
FIG. 11B is a partial side view of the components shown in FIG. 11A in position on a main antenna mount according to embodiments of the present invention.

Turning now to FIGS. 11A and 11B, as shown, similar to the embodiments discussed above, the clamp 80 can be configured to (circumferentially) clamp directly against the threads 61t of the adjuster bolt 61 via arms 86 of the clamp 80. The clamp 80 can couple to the bracket 58 of the elevation adjustment sub-assembly and the pivot bolt 163 can extend through the clamp arms 86 and into the slot 42 of the first pole bracket $40_1$. The lower arm 86b can abut the upper surface of the projection 59 of the bracket 58. The bolt head 61h of the adjuster bolt 61 can reside against the adjuster boss 66 which is held by an end portion 40e of the first pole bracket $40_1$ to be parallel to the pivot bolt 163 and perpendicular to the adjuster bolt 61.

In the embodiment shown in FIGS. 11A and 11B, a center point of the radius "r" of the boss 66 can define point "$C_3$". "$C_2$" corresponds to the point on the axis $A_1$-$A_1$ of the adjuster bolt 61 at the intersection with a line drawn from the pivot bolt 163 and "$C_1$" corresponds to the center of the pivot bolt as discussed above with respect to FIG. 5A as points $C_1$, $C_2$, $C_3$ that can define a respective virtual vertex of a triangle adjustment configuration. In this embodiment, by way of example, the fixed "X" distance can be in a range of about 5 mm to 30 mm.

Figure 12A:
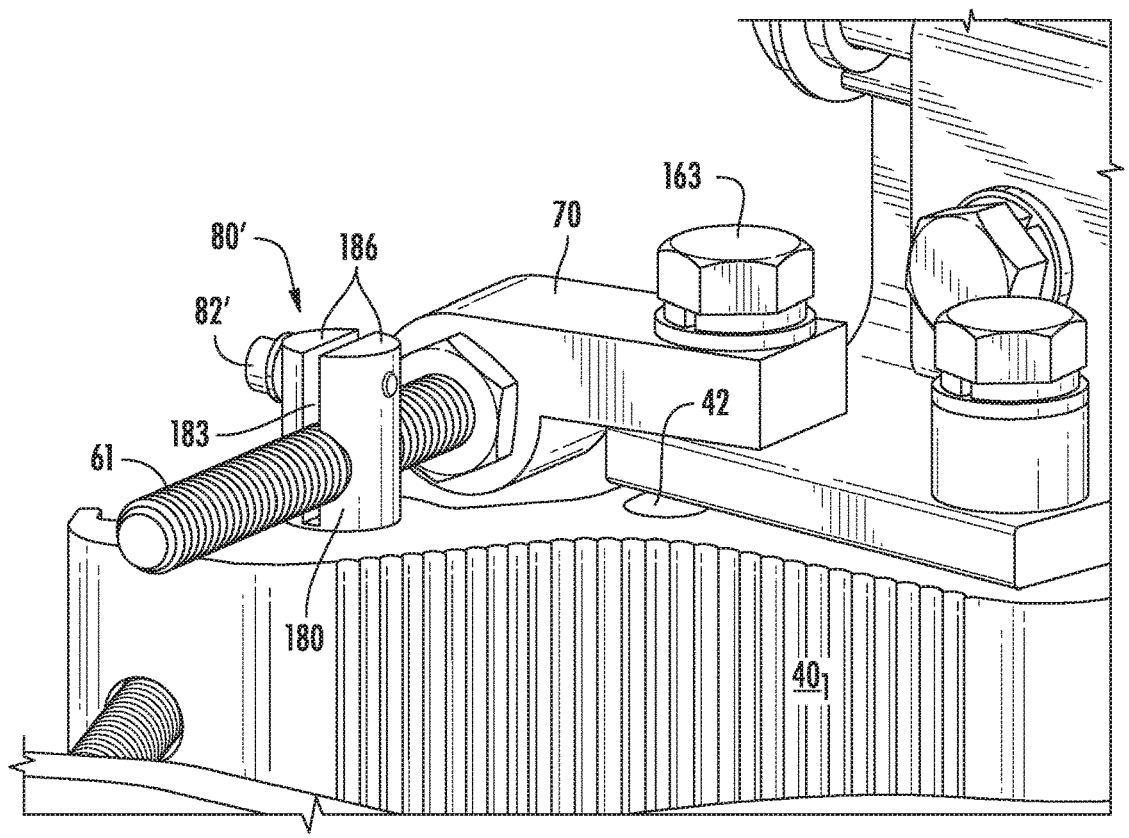
FIG. 12A is a partial side perspective view of another embodiment of an antenna mount according to embodiments of the present invention.
Figure 12B:
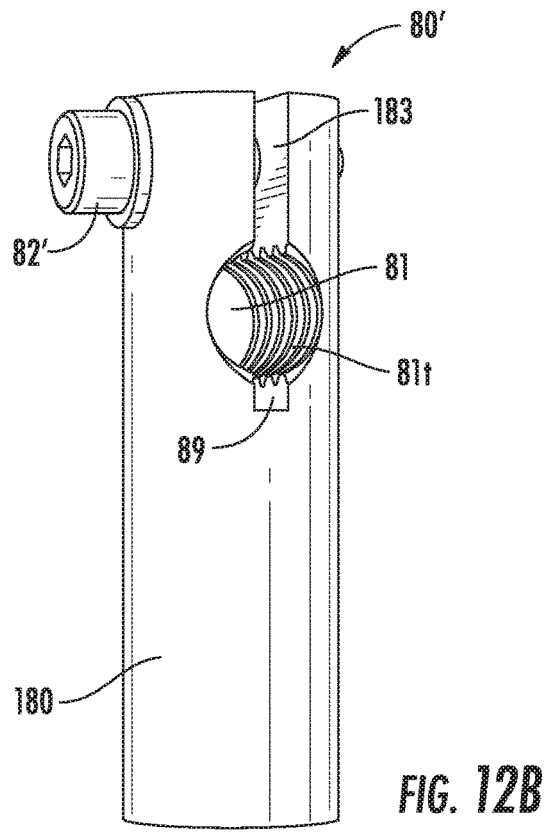
FIG. 12B is an enlarged side perspective view of the clamp shown in FIG. 12A according to embodiments of the present invention.

Referring to FIGS. 12A and 12B, in yet other embodiments, the adjuster boss 66 can be configured to be the clamp 80' that can directly clamp onto threads 61t of the adjuster bolt 61. Thus, as shown, the clamp 80' can have a cylindrical primary body 180 that provides the open cylindrical channel 81 that receives the adjuster bolt 61. The channel 81 can include the threads 81t. The clamp 80' can have semicircular laterally spaced apart upper end portions 186 that reside above the channel 81 and have apertures 186a that receive a clamp member 82' (i.e., screw or bolt) and the upper end portions 186 can have an open gap space 183 therebetween. The clamp 80' can optionally also include a recess 89 parallel to and below the open channel 81. The clamp 80' is held by and end portion 40e of the first pole clamp $40_1$. The clamp member 82' can extend laterally above and across the channel 81.

Referring to FIGS. 13A-13E, the clamp 80" can be configured to have a clamp member 182 (i.e., bolt or screw) that can apply a clamp force in a plane neutral to the adjuster bolt 61, i.e., in a clamping axis that is axially aligned with the clamp screw, straight down onto the bolt 61. The clamp 80" can have a primary cylinder body 180 similar to that shown in FIG. 12A but can have an open downwardly extending channel 205. In this embodiment, a collar 185 with a cylindrical open channel 81 (perpendicular to channel 205) comprising threads 81t can be sized and configured to be held in a cylindrical channel 181 of the primary body 180. The collar 185 can have internal threads 81t and one or more recess 89 and that is parallel to the channels 181 and 81. An outer jacket 190 can be sized and configured to prevent linear motion of the collar 185. The outer jacket 190 can be cylindrical with an open cylindrical downwardly extending channel sized and configured to extend over the primary body 180 and hold the collar 185 in position. The collar 185 and the cylindrical channel 181 of the primary body 180 can have matched flat surfaces 180f, 185f to inhibit the collar 185 from spinning.

Figure 13A:
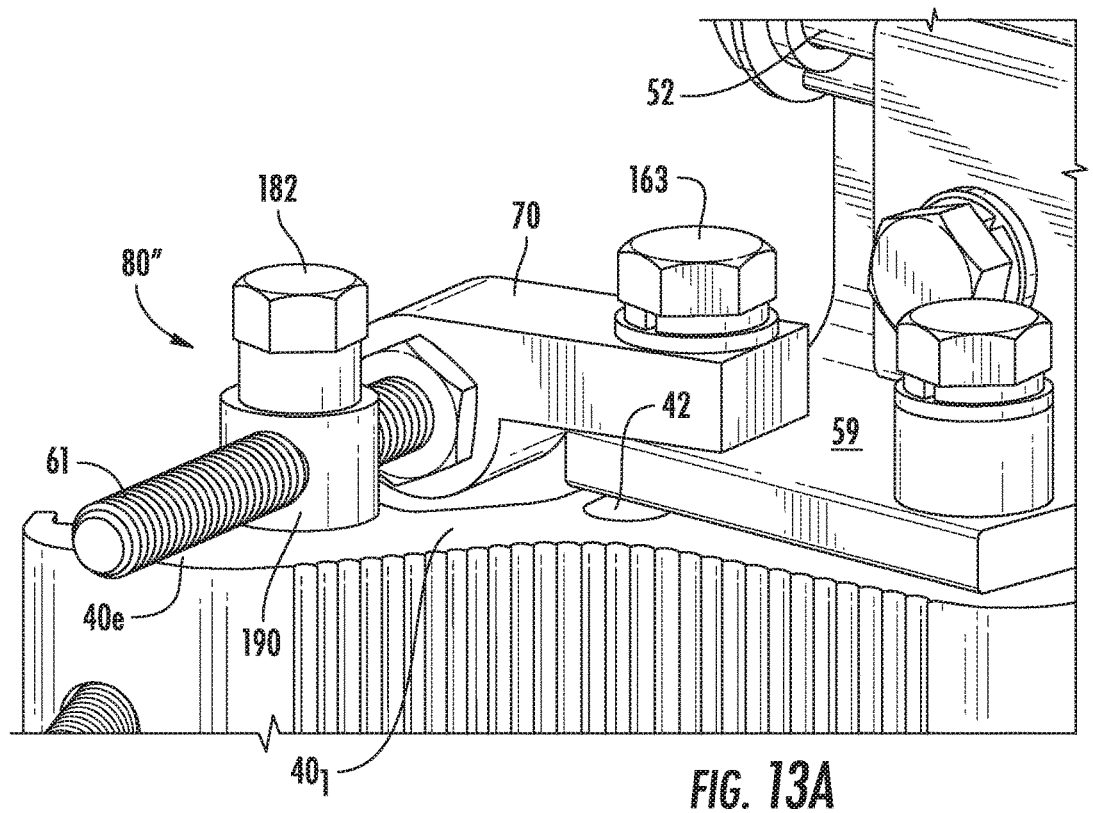
FIG. 13A is a partial side perspective view of another embodiment of an antenna mount according to embodiments of the present invention.
Figures 13B, 13C, 13D, 13E:
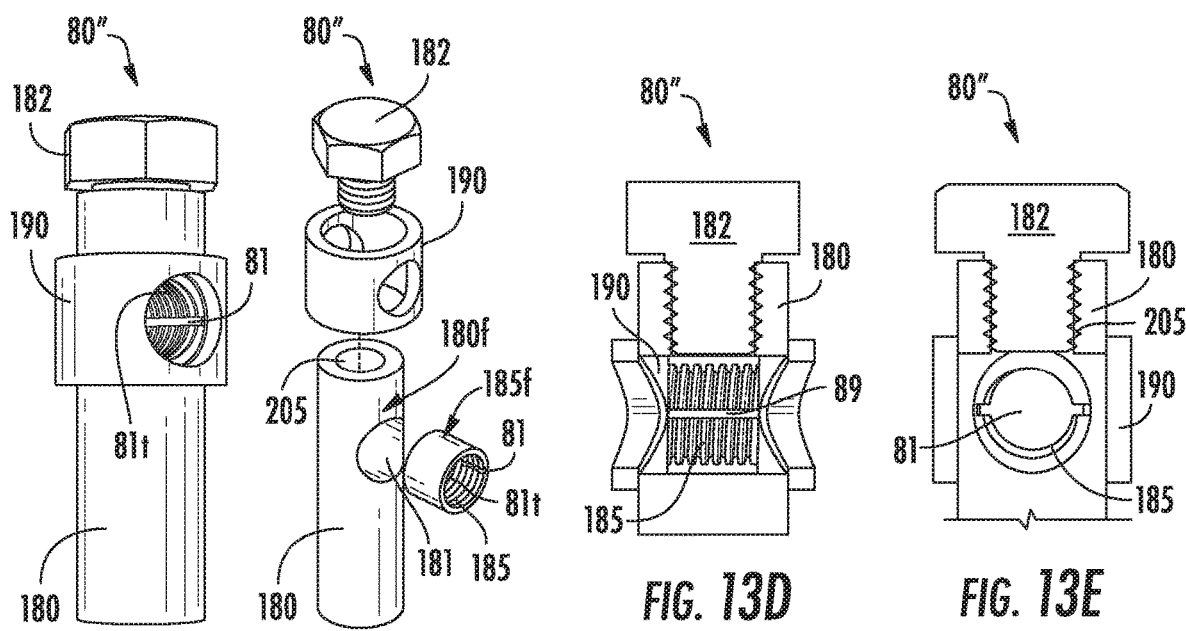
FIG. 13B is an enlarged side perspective assembled view of the clamp shown in FIG. 13A according to embodiments of the present invention.
FIG. 13C is an exploded view of the clamp shown in FIG. 13B.
FIGS. 13D and 13E are partial assembled section views of the clamp shown in FIG. 13B.
Figure 14A:
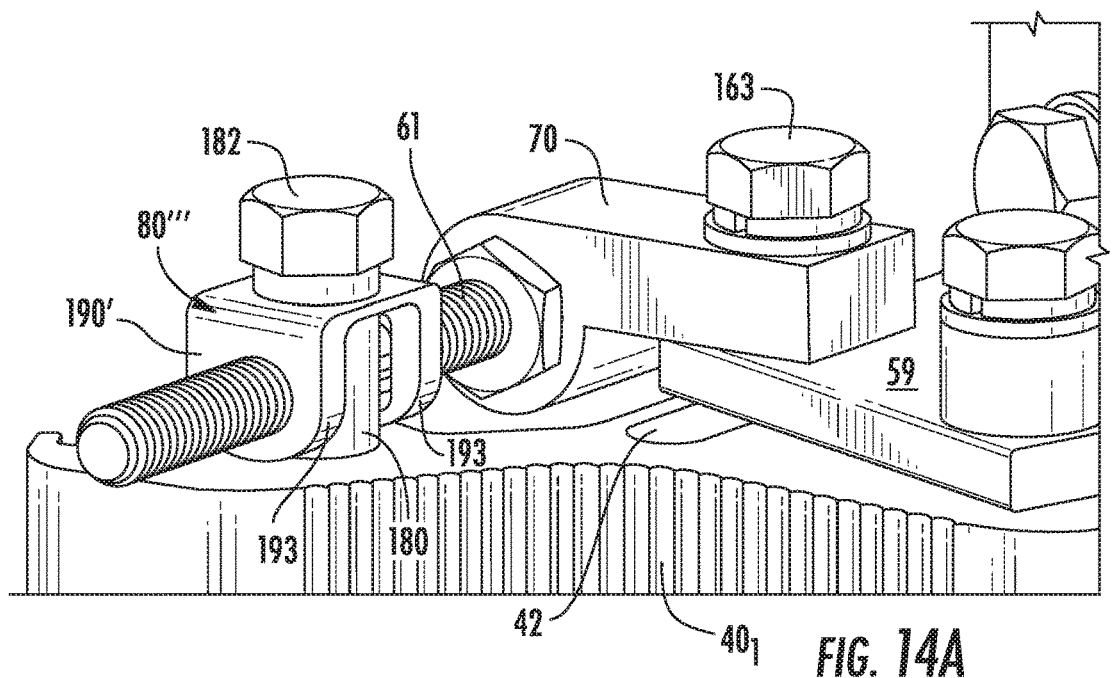
FIG. 14A is a partial side perspective view of another embodiment of an antenna mount according to embodiments of the present invention.
Figure 14B:
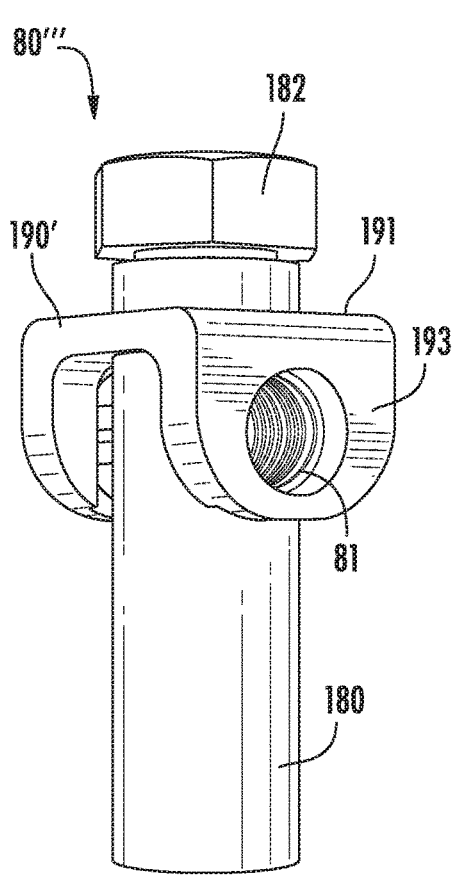
FIG. 14B is an enlarged side perspective assembled view of the clamp shown in FIG. 14A according to embodiments of the present invention.
Figure 14C:
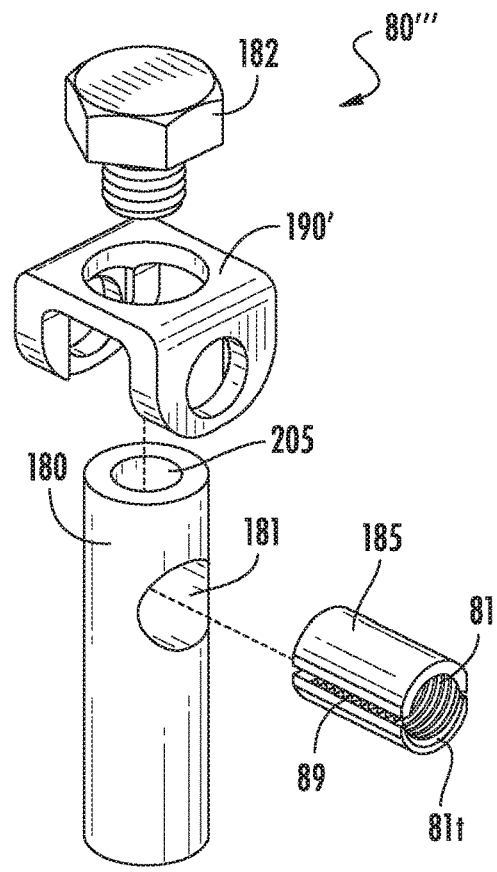
FIG. 14C is an exploded view of the clamp shown in FIG. 14B.

FIGS. 14A-14C illustrate a clamp 80''' that is similar to that discussed with respect to FIG. 13A. In this embodiment, the outer jacket 190' can have a flat upper surface 191 with spaced apart arms 193 that extend downward and hold the collar 185 with the internal threads 81t in the cylindrical channel 181 of the primary body 180. Again, the cylindrical body 180 can have an upper end with an open downwardly extending channel 205 that receives the clamp member 182. The collar 185 can have one or more recess 89 parallel to the channel 81.

FIGS. 15A-15C illustrate a clamp 80'''' that is similar to that discussed with respect to FIG. 14A. In this embodiment, the outer jacket 190" can have a flat upper surface 191 with spaced apart arms 193' that extend perpendicularly outward from the primary body 180 and that holds the collar 185 with the internal threads 81t in the cylindrical channel 181 of the primary body 180. The collar 185 can have one or more recess 89 parallel to the channel 81.

Referring to FIGS. 16A-16E, these figures illustrate that the clamp bolt 82" can have a quick release configuration. The clamp bolt handle 82h pivots about a pivot 82p over a cam surface 82c to engage the clamp bolt 82 between locked (FIG. 16B) and unlocked (FIG. 16A) positions to engage or disengage the threaded shaft 82t of the clamp member 82" from one or both of the side arms 86 of the clamp 80. The clamp force can be automatically applied when closed to a fully locked position so that there is no need for an installer to torque to lock into position.

Figure 17:
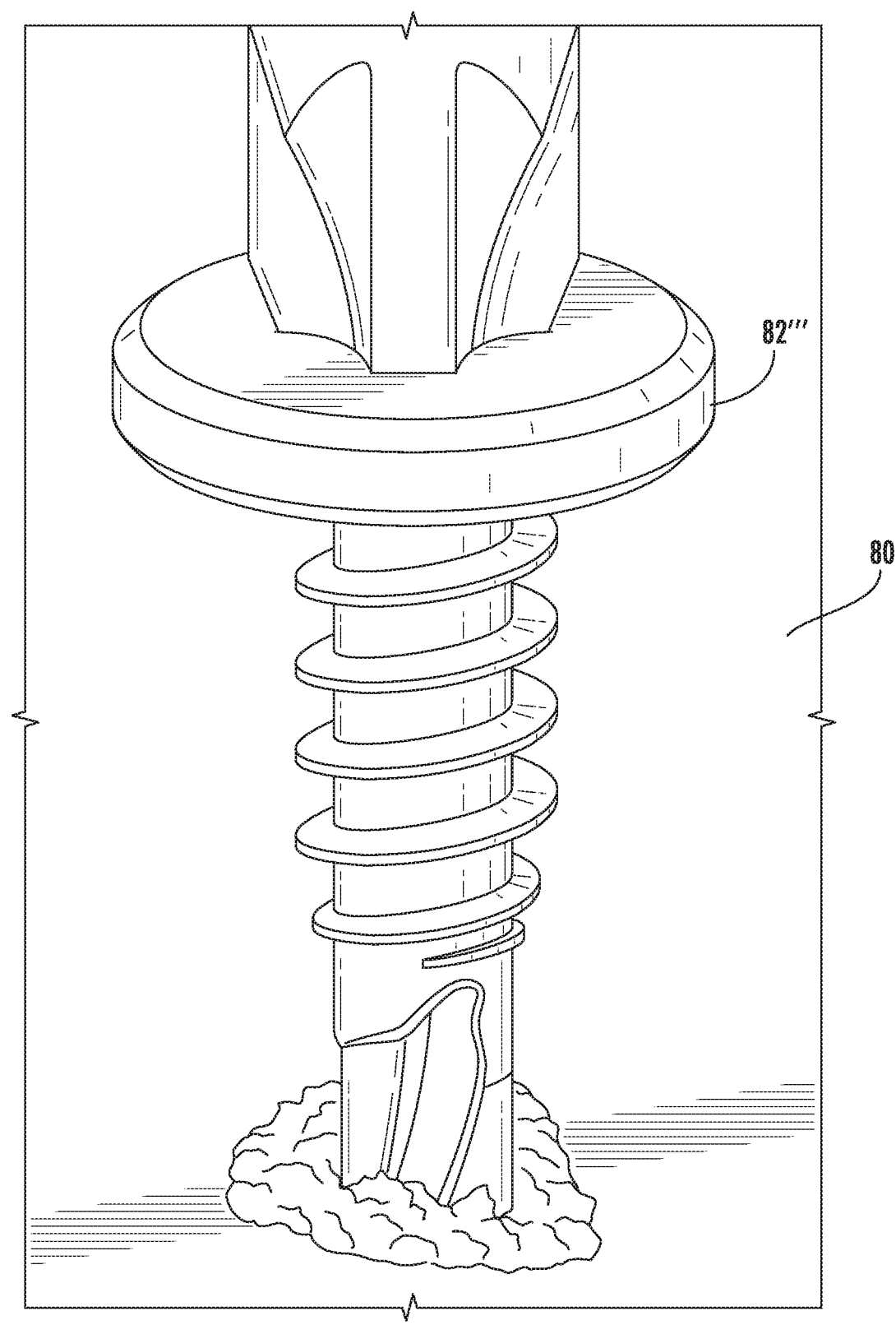
FIG. 17 is an enlarged side perspective view of a self-tapping screw used with the clamp for the adjuster bolt according to embodiments of the present invention.

Referring to FIG. 17, it is also contemplated that a self-tapping screw 82''' can be used to provide a threaded bore in the clamp 80 to match the screw thread to enhance friction when fully clamped.

Figure 18A:
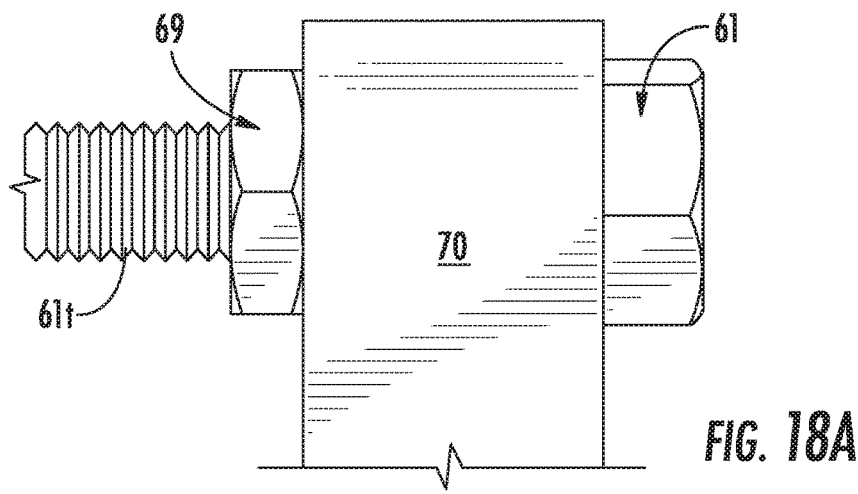
FIG. 18A is an enlarged partial side view of an example pivot body, retention member and adjuster bolt according to embodiments of the present invention.
Figure 18B:
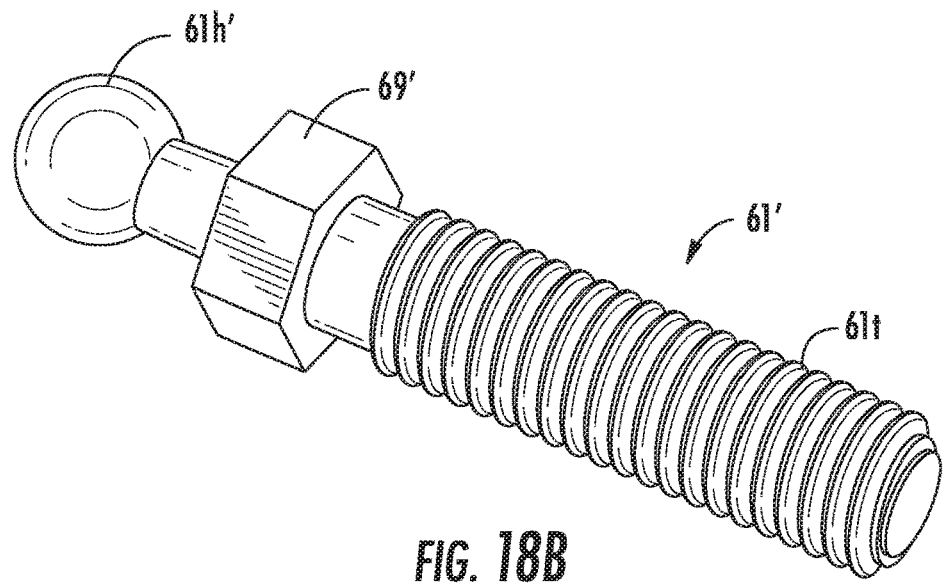
FIGS. 18B and 18C are side perspective view of alternative adjuster bolt configurations according to embodiments of the present invention.
Figure 18C:
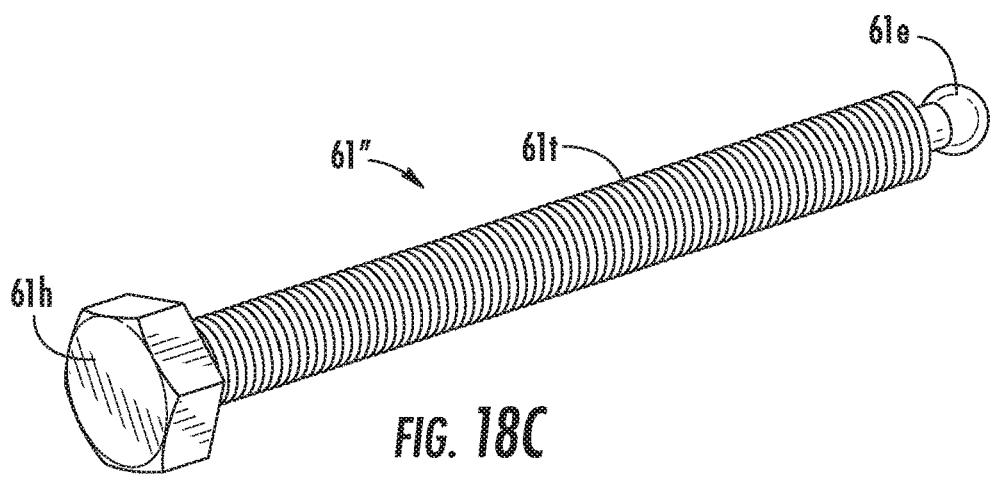

FIG. 18A is an enlarged partial view of the adjuster bolt 61 with the retention nut and part of the pivot body 70. FIGS. 18B and 18C illustrate alternative adjuster bolts 61', 61"

with a different bolt captivation configuration which do not require a retention nut 69 and may prevent misuse of the adjustment mechanism and/or provide a reduction in hardware components. FIG. 18B shows the adjuster bolt 61' can include an integrated (monolithic shaped) retention feature 69' and an alternative bolt head 61*h* from that shown in FIG. 18A. FIG. 18C illustrates the adjuster bolt 61" with threads 61*t* and an alternative end configuration on the end 61*e* opposing the head 61*h*.

Figure 19:
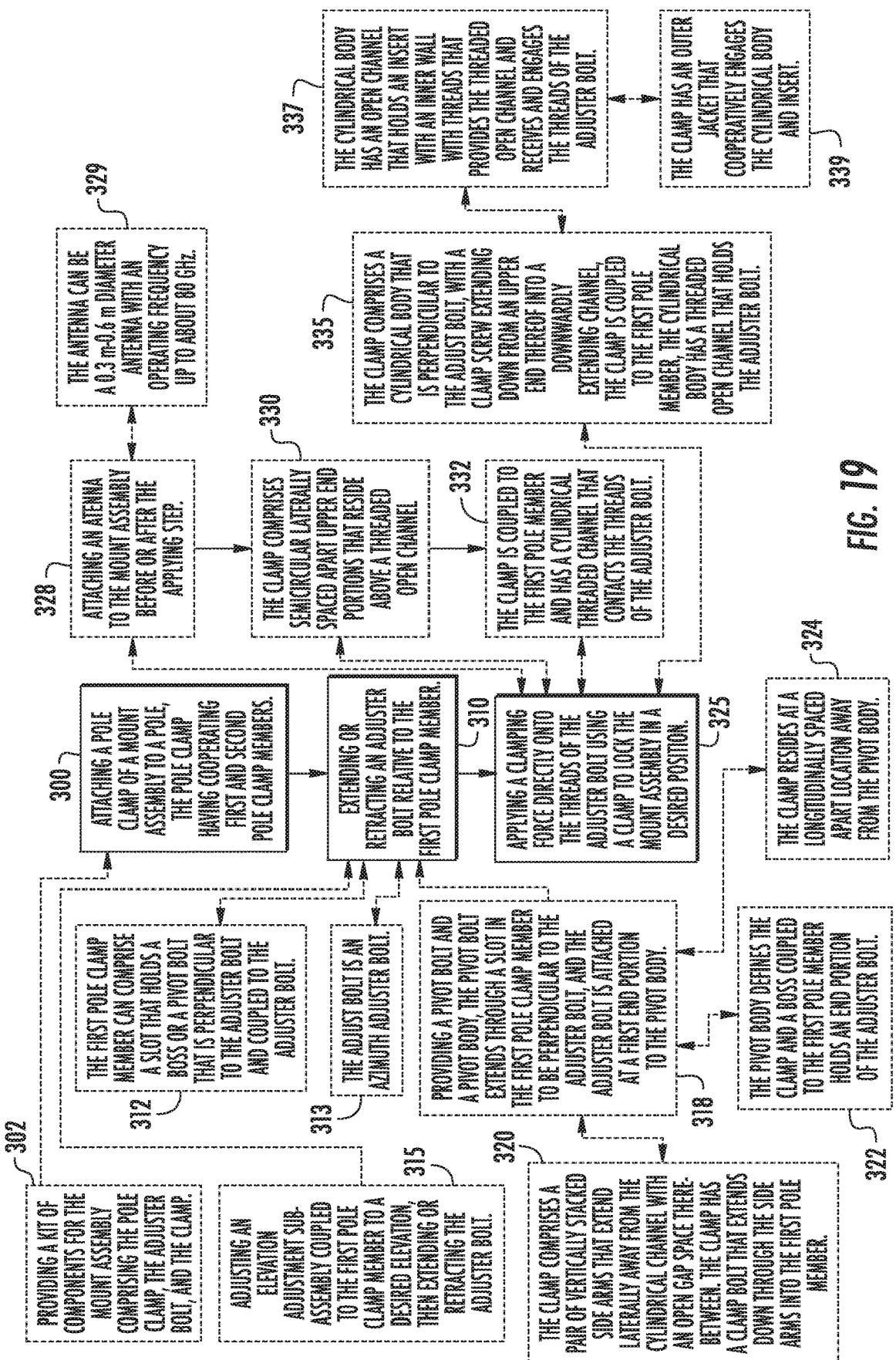
FIG. 19 is an exemplary flow chart of actions that can be used to lock an adjustable mount assembly into a desired position.

FIG. 19 illustrates exemplary actions that can be used to attach an antenna mount to a target pole. A pole clamp of a mount assembly can be attached to a pole, the pole clamp having cooperating first and second pole clamp members (block 300). An adjuster bolt can be extended or retracted relative to the first pole clamp member (block 310). A clamping force is applied directly onto the threads of the adjuster bolt using a clamp to lock the antenna mount in a desired position (block 325).

The method can include providing a kit of components for the mount assembly comprising the pole clamp, the adjuster bolt, and the clamp (block 302).

In some embodiments, the first pole clamp member can comprise a slot that holds a boss or a pivot bolt that is perpendicular to the adjuster bolt and is coupled to the adjuster bolt (block 312).

The adjuster bolt can be an azimuth adjuster bolt (block 313).

The method can include adjusting an elevation adjustment sub-assembly coupled to the first pole clamp member to a desired elevation, then extending or retracting the adjuster bolt (block 315).

The method can include providing a pivot bolt and a pivot body, the pivot bolt, when installed, extends through a slot in the first pole clamp member to be perpendicular to the adjuster bolt, and the adjuster bolt is attached at a first end portion to the pivot body (block 318).

The clamp can comprise a pair of vertically stacked side arms that extend laterally away from the cylindrical channel with an open gap space therebetween. The clamp can have a clamp member (i.e., bolt or screw) that extends down through the side arms into the first pole member (block 320).

The pivot body can define the clamp and a boss spaced apart from the pivot body and coupled to the first pole member holds an end portion of the adjuster bolt (block 322).

The clamp resides at a longitudinally spaced apart location away from the pivot body (block 324).

The method can include attaching an antenna to the mount assembly before or after the applying step (block 328). In some particular embodiments, the antenna can optionally be a 0.3 m-0.6 m diameter antenna. The antenna operating frequency up to about 80 GHz, optionally in a range of about 7 GHz to about 80 GHz (block 329).

The clamp can have semicircular laterally spaced apart upper end portions that reside above a threaded open longitudinally extending channel (block 330).

The clamp can be coupled to the first pole member and can have a cylindrical threaded channel that contacts the threads of the adjuster bolt (bolt 332).

The clamp can have a cylindrical body that is perpendicular to the adjuster bolt, with a clamp member (i.e., bolt or screw) extending down from an upper end thereof into a downwardly extending channel. The clamp can be coupled to the first pole member and the cylindrical body can have a threaded open channel that holds the adjuster bolt (block 335).

The cylindrical body can have an open channel that holds an insert with an inner wall with threads that provides the threaded open channel and receives and engages the threads of the adjuster bolt (block 337). The clamp can have an outer jacket that cooperatively engages the cylindrical body and insert (block 339).

Note that the typical alignment precision for an antenna is related to the 0.3×3 dB beam width of the antenna, and this value for an 80 GHz, 1 ft antenna is +/−0.27° or less. As such, the precision lockable adjustment should be effective for proper adjustment of the azimuth and elevation angles of antennas mounted on the antenna mounts described herein.

While embodiments of the invention are particularly suitable for antenna mount assemblies including azimuth or elevation adjustment sub-assemblies, the invention is not limited thereto and may be useful for mounting other devices where precision is desired.

Those skilled in this art will also appreciate that the arrangements illustrated and described herein may be applicable to devices other than antennas that require precise alignment. For example, in free space optical communications, the communication links employ lasers rather than antennas, and such lasers require precise angular alignment. The concepts discussed herein may be used in conjunction with such equipment to precisely align devices of this sort. Other devices and environments may be apparent to those of skill in this art.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A mount assembly comprising:
   a pole clamp having cooperating first and second pole clamp members;
   an adjuster bolt comprising external threads coupled to the first pole clamp member; and
   a single adjuster bolt clamp directly attachable to the external threads of the adjuster bolt whereby the single adjuster bolt clamp is sized and configured to lock the adjuster bolt in a desired position,
   wherein the single adjuster bolt clamp is coupled to the first pole clamp member and has a cylindrical threaded open through channel that contacts the threads of the adjuster bolt, and wherein the single adjuster bolt clamp applies a clamp force to lock the adjuster bolt in the desired position without any retaining nuts.

2. The mount assembly of claim 1, wherein the first pole clamp member comprises a slot, wherein the mount assembly further comprises a pivot bolt coupled to a pivot body, wherein the pivot bolt extends through the slot in a direction that is perpendicular to the adjuster bolt, wherein the pivot bolt is coupled to a first end portion of the pivot body, and wherein a laterally spaced apart second end portion of the pivot body is coupled to the adjuster bolt.

3. The mount assembly of claim 2, wherein the second end portion of the pivot body comprises a cylindrical channel that encloses a segment of the adjuster bolt.

4. The mount assembly of claim 3, wherein the adjuster bolt comprises a bolt head on one side of the pivot body and a retention member on an opposing longitudinally spaced apart side of the pivot body to hold the adjuster bolt against the pivot body.

5. The mount assembly of claim 1, wherein the first pole clamp member comprises a slot, wherein the mount assembly further comprises a pivot bolt that extends down through the slot in a direction that is perpendicular to the adjuster bolt, and wherein the pivot bolt holds a first end portion of a pivot body that defines the adjuster bolt clamp.

6. The mount assembly of claim 2, further comprising an adjuster boss spaced apart from the pivot bolt and coupled to the first pole clamp member, wherein the adjuster boss is also coupled to the adjuster bolt at a location that is spaced apart from the pivot body.

7. A mount assembly comprising:
a pole clamp having cooperating first and second pole clamp members;
an adjuster bolt comprising external threads coupled to the first pole clamp member; and
a single adjuster bolt clamp directly attachable to the external threads of the adjuster bolt whereby the single adjuster bolt clamp is sized and configured to lock the adjuster bolt in a desired position,
wherein the adjuster bolt clamp comprises first and second vertically stacked side arms that extend laterally away from a cylindrical channel with an open gap space therebetween, wherein the cylindrical channel comprises threads that directly contact the threads of the adjuster bolt to directly attach thereto, and wherein the adjuster bolt clamp has a clamp member that extends down through the first side arm, across the open gap space, through the second side arm and into the first pole clamp member and is sized and configured to change a profile of the cylindrical channel when torqued to a defined threshold value.

8. The mount assembly of claim 7, wherein the cylindrical channel comprises a longitudinally extending recess at a location diametrically opposed to the open gap space.

9. A mount assembly comprising:
a pole clamp having cooperating first and second pole clamp members;
an adjuster bolt comprising external threads coupled to the first pole clamp member; and
a single adjuster bolt clamp directly attachable to the external threads of the adjuster bolt whereby the single adjuster bolt clamp is sized and configured to lock the adjuster bolt in a desired position,
wherein the adjuster bolt clamp comprises semicircular upwardly extending and laterally spaced apart upper end portions that reside above a threaded open channel, wherein the threaded open channel is cylindrical and is directly attachable to the external threads of the adjuster bolt while the semicircular upwardly extending and laterally spaced apart upper end portions remain in position above the threaded open channel and the adjuster bolt.

10. A mount assembly comprising:
a pole clamp having cooperating first and second pole clamp members;
an adjuster bolt comprising external threads coupled to the first pole clamp member; and
a single adjuster bolt clamp directly attachable to the external threads of the adjuster bolt whereby the single adjuster bolt clamp is sized and configured to lock the adjuster bolt in a desired position,
wherein the adjuster bolt has a length that terminates into a free end and that extends beyond the adjuster bolt clamp and is devoid of any retaining nuts, wherein the adjuster bolt clamp comprises a cylindrical body that is perpendicular to the adjuster bolt, wherein the adjuster bolt clamp is coupled to the first pole clamp member, wherein the first and second pole clamp members are attached by first and second bolts extending therebetween, and wherein the cylindrical body has an open channel with threads that attaches to the threads of the adjuster bolt.

11. The mount assembly of claim 10, wherein the open channel of the cylindrical body holds an insert with an inner wall with threads that provides the threads of the open channel that attaches to the threads of the adjuster bolt.

12. The mount assembly of claim 11, wherein the adjuster bolt clamp has an outer jacket that resides above the first pole clamp member and cooperatively engages the cylindrical body and the insert.

13. The mount assembly of claim 9, further comprising a radially extending clamp member that resides across an upper end portion of the semi-circular members above the threaded open channel, wherein the radially extending clamp member is sized and configured to pull the pair of semi-circular members closer together to exert a clamping force along the threaded open channel.

14. The mount assembly of claim 1, wherein the adjuster bolt is an azimuth adjuster bolt, wherein the mount assembly further comprises a bracket holding an elevation adjuster bolt above a projecting lower portion of the bracket, wherein the projecting lower portion holds a pivot bolt that extends down into a slot of the first pole clamp member, and wherein the pivot bolt is coupled to a pivot body that holds the azimuth adjuster bolt at a location spaced apart from the adjuster bolt clamp.

15. The mount assembly of claim 14, wherein the adjuster bolt has a longitudinally extending centerline defining an axis, wherein a distance between a first point on the axis that is in line with a center point of a radius of the pivot bolt is constant and defines a fixed x-direction distance, wherein a distance between the first point a second point on the axis that is in line with a center point of a radius of the first pole clamp member or a boss that holds the adjuster bolt defines an adjustable length in a y-direction, and wherein an angle θ defined between a first line extended from the center point of the radius of the pivot bolt to the first point and a second line extended from the center point of the radius of the pivot bolt to the second point is adjustable in a range between upper and lower angular degrees.

16. The mount assembly of claim 7, wherein the adjuster bolt clamp comprises a quick release handle that is coupled to the clamp member.

17. The mount assembly of claim 7, wherein the clamp member comprises a self-tapping screw.

18. The mount assembly of claim 2, wherein the adjuster bolt, pivot body and adjuster bolt clamp cooperate with the first pole clamp member to provide a +/−15 degree azimuth adjustment, and wherein the mount assembly is an antenna mount assembly sized and configured to hold an antenna.

19. A method of aligning an antenna attached or attachable to a pole, comprising:
attaching a pole clamp of a mount assembly to the pole, the pole clamp having cooperating first and second pole clamp members;
extending or retracting an azimuth adjuster bolt with threads relative to the first pole clamp member for azimuth adjustment; and
applying a clamping force directly onto the threads of the adjuster bolt using a single adjuster bolt clamp without any retaining nuts coupled to the single clamp to lock the mount assembly in a desired azimuth alignment position.

20. The method of claim 19, wherein the applied clamping force is a circumferentially extending clamping force.

\* \* \* \* \*